United States Patent [19]

Ohba

[11] Patent Number: 4,885,702
[45] Date of Patent: * Dec. 5, 1989

[54] METHOD OF FORMING CURVED SURFACES AND THE APPARATUS

[75] Inventor: Akio Ohba, Kanagawa, Japan

[73] Assignee: Sony Corporation, Tokyo, Japan

[*] Notice: The portion of the term of this patent subsequent to Dec. 13, 2005 has been disclaimed.

[21] Appl. No.: 268,773

[22] Filed: Nov. 9, 1988

Related U.S. Application Data

[63] Continuation of Ser. No. 888,846, Jul. 22, 1986, Pat. No. 4,791,581.

[30] Foreign Application Priority Data

| Jul. 27, 1985 | [JP] | Japan | 60-166312 |
| Oct. 24, 1985 | [JP] | Japan | 60-238166 |
| Nov. 25, 1985 | [JP] | Japan | 60-266575 |

[51] Int. Cl.$^4$ .......................................... G06F 15/72
[52] U.S. Cl. ................................. 364/521; 364/522; 340/729
[58] Field of Search ............... 364/518, 521, 414, 470, 364/519, 520, 522; 340/729, 747

[56] References Cited

U.S. PATENT DOCUMENTS

| 4,276,570 | 6/1981 | Burson et al. | 358/903 |
| 4,357,660 | 11/1982 | Hepp | 364/522 |
| 4,620,287 | 11/1986 | Yam | 364/518 |
| 4,625,289 | 11/1986 | Rockwood | 364/522 |
| 4,649,498 | 3/1987 | Kedem et al. | 364/518 |
| 4,654,805 | 3/1987 | Shoup, II | 364/520 |
| 4,674,059 | 6/1987 | Schrieber | 364/523 |
| 4,698,768 | 10/1987 | Thuy et al. | 364/521 |
| 4,703,440 | 10/1987 | Birk et al. | 364/521 |

Primary Examiner—David L. Clark
Attorney, Agent, or Firm—Philip M. Shaw, Jr.

[57] ABSTRACT

A method and apparatus for interactively generating and visually displaying deformed, free curved surfaces using a computer aided display apparatus by designating a desired deformation area, including an action point, on a non-deformed surface, determining a vector field function Fi (deformation rate) at each point within the deformation area; designating a deformation vector $V_i^*$ (deformation quantity and direction) at the action point; adding the position vector $P_{i-1}^*$ (non-deformed curved surface) to the position vector $V_i^* * F_i$ (deformation quantity) to generate a position vector $P_i^*$ (deformed curved surface); and visually displaying the deformed curved surface represented by the position vector $P_i^*$.

5 Claims, 18 Drawing Sheets

CURVED SURFACE FORMING APPARATUS

DESIGNATION OF ACTION POINT

DISPLAY OF CURVED SURFACE

VECTOR FIELD FUNCTION Fi

CURVED SURFACE FORMING APPARATUS

**PROCESS PROCEDURE
OF CURVED SURFACE DEFORMATION**

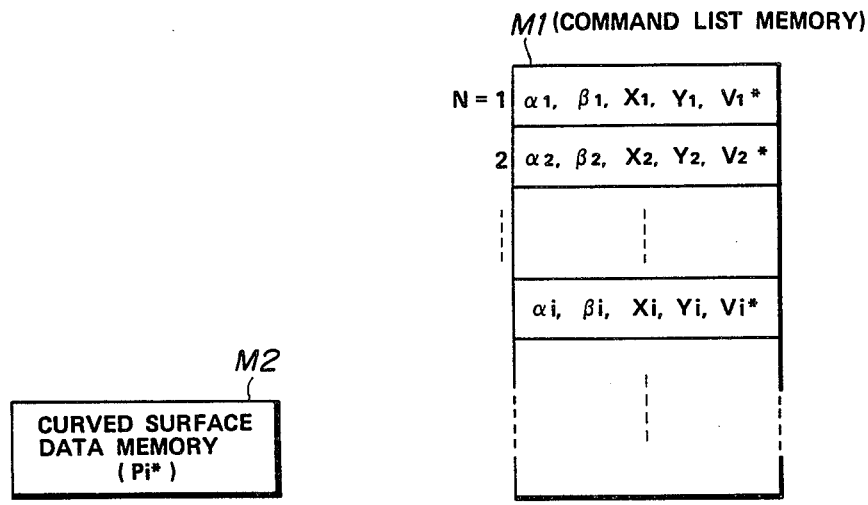
FIG.6(A)     FIG.6(B)
MEMORY OF CURVED SURFACE CALCULATOR
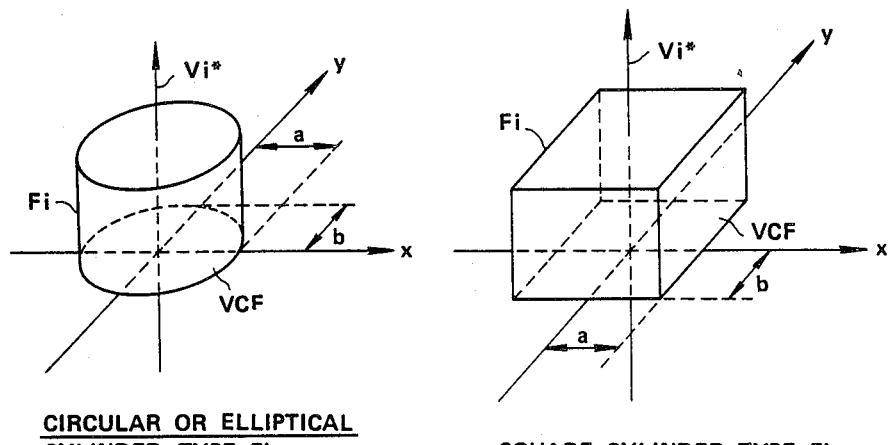
CIRCULAR OR ELLIPTICAL CYLINDER TYPE Fi
SQUARE CYLINDER TYPE Fi
FIG.7     FIG.8

CIRCULAR OR ELLIPTICAL
CONE TYPE Fi

SQUARE CONE TYPE Fi

SPHERICAL TYPE Fi

PRISM TYPE Fi

POSITION TRANSFORMATION

POSITION TRANSFORMATION

POSITION TRANSFORMATION TO DEFORMED CURVED SURFACE

POSITION TRANSFORMATION TO DEFORMED CURVED SURFACE

POSITION TRANSFORMATION TO DEFORMED CURVED SURFACE

DEFORMED CURVED SURFACE

DEFORMED CURVED SURFACE

DEFORMED CURVED SURFACE

POSITION TRANSFORMATION

POSITION TRANSFORMATION

POSITION TRANSFORMATION TO
DEFORMED CURVED SURFACE

POSITION TRANSFORMATION TO
DEFORMED CURVED SURFACE

POSITION TRANSFORMATION TO
DEFORMED CURVED SURFACE

DRESS DESIGN FORMING APPARATUS

BODY FORM DATA
SURFACE

DESIGNATION OF ACTION POINT (A)     PHYSIOGNOMIC IMAGE     (B)

(A)     PHYSIOGNOMIC IMAGE     (B)     (C)

FACIAL EXPRESSION C.S. DATA

FACE IMAGE ON DISPLAY

KEY FRAME ARRANGEMENT

ANIMATION DATA FORMING PROCEDURE

METHOD OF FORMING CURVED SURFACES AND THE APPARATUS

This is a continuation of application Ser. No. 888,846, filed July 22, 1986, now U.S. Pat. No. 4,791,581.

BACKGROUND OF THE INVENTION

1. Field of the Invention

The present invention relates to a method of electronically generating data representative of curved surfaces and the apparatus based upon the method, and more specifically to a method of freely generating data representative of a new curved surface by applying a local deformation on a source curved surface using computer graphic techniques and apparatus.

2. Description of the Prior Art

In the conventional computer graphics, there have been adopted various methods of forming stereographic curved surfaces. In one example thereof, data of plural fundamental curved surfaces (referred to as primitive curved surfaces) representative of a cylinder, a sphere, etc. are previously prepared and a new curved surface can be formed, as required, in combination with these primitive curved surfaces. In another example thereof, points on a curved surface to be newly formed are designated as control points and a curved surface passing through these control points is interpolated on the basis of a spline function.

In these prior art methods, the basic concept is as follows: the external shapes of primitive curved surfaces are previously determined as fundamental shapes and a required curved surface is formed by deformation-processing the curved surfaces on the basis of the above fundamental shapes. Therefore, it is possible to form a satisfactory curved surface, in practical use, as long as the external appearance or the shape of a mechanical object is represented.

In the case where a curved surface is formed on the basis of a spline function, in practice, since it is necessary to set a great number of control points, the control points should be determined within a practically allowable range by the use of primitive curved surfaces or by the combination of cross-sections thereof in order to form a great number of control points. Therefore, the features of this method are practically the same as in the case where primitive curved surfaces are combined with each other.

However, in the case where a curved surface representative of a human face, for instance, should naturally be formed so as to provide a soft facial expression (referred to as a free curved surface) different from the primitive curved surfaces, it is not practically satisfactory to adopt the prior art methods of forming a curved surface, because the features of the primitive curved surfaces exert a strong influence upon the formed curved surface.

In addition, in forming a new curved surface, it is impossible to readily obtain a curved surface appropriately agreeing with the one which the operator wants to obtain, unless the correlation between an image represented on the display screen on the basis of the image data to be processed by a computer and data to be controlled or determined by the operator is easy to understand intuitively. Therefore, it is preferable that parameters inputted by the operator and the resultant change in the curved surface on the display screen should have an intuitive mutual relationship for providing a better operation.

SUMMARY OF THE INVENTION

With these problems in mind, therefore, it is the primary object of the present invention to provide a method and apparatus for electronically generating data representative of curved surfaces with a high degree of freedom, which cannot so far be attained by the conventional curved surface forming technology.

Another object of the present invention is to provide a method of electronically generating data representative of curved surfaces whereby a free curved surface such as a human face, for instance, which is difficult to represent in dependence upon combinations of primitive curved surfaces, can be formed.

It is a further object to display such a curved surface on a display screen in such a way that a parameter intuitively selected by the operator can cause a change in a displayed image at high speed.

Still another object of the present invention is to allow the operator to display a free curved surface approximate to the one which he requires to obtain, in an interactive fashion to the computer, by locally deforming a displayed curved surface step by step and trial and error.

Still another object of the present invention is to apply the above-mentioned free curved surface forming method to dress design work in such a way that a cloth figure or pattern described on a plane paper dress pattern is simulated so as to provide an observation as to whether the designed cloth figure looks attractive when the tailored dress is put on a person.

Still another object of the present invention is to apply the above free curved surface forming technique to the method of forming a montage image by which an image of a standard human face is locally deformed so as to give a natural facial expression.

Still a further object of the present invention is to allow the operator to readily recognize various computed decisions of a computing apparatus by forming image data representative of various human body expressions in accordance with the above-mentioned free curved surface forming method and by displaying the decision results obtained through a computer on the display in the form of such image expressions representative of one or more selected portions of a human body, e.g. a smile, a wink, or a hand gesture.

To achieve the above-mentioned objects, the method of forming a curved surface according to the present invention comprises the following steps of electronically: (a) generating data representative of a desired deformation area including an action point on a non-deformed surface; (b) determining a vector field function $F_i$ representative of a relative deformation rate at each point within the deformation area; (c) designating a deformation vector $V_i^*$ representative of a deformation quantity and a deformation direction at the action point within the deformation area; (d) calculating a position vector representative of a deformation quantity of a curved surface at each point within the deformation area on the vector $V_i^*$ and the vector field function $F_i$; and (e) calculating a position vector $P_i^*$ representative of a deformed curved surface on the basis of the position vector representative of deformation quantity of the curved surface and a position vector $P_{i-1}^*$ representative of the surface to be deformed.

Since the deformed curved surface can be displayed intuitively on a display substantially in real time, and since the parameters such as an action point, a deformation area, a quantity and a direction of deformation vector can be set while watching the displayed curved surface, the operator can form any desired curved surfaces in interactive fashion.

Further, the position vector representative of a transformed curved surface can be obtained recurrently by adding the position vector representative of a non-transformed curved surface to the position vector representative of a deformed curved surface. Therefore, the deformation operation can be repeated step by step and by trial and error in sufficiently short time intervals to allow the operator to readily form a free curved surface sufficiently approximate to the one which the operator wants to obtain.

BRIEF DESCRIPTION OF THE DRAWINGS

The features and advantages of the method of forming a curved surface and the apparatus based upon the method according to the present invention will be more clearly appreciated from the following description of the preferred embodiments of the invention taken in conjunction with the accompanying drawings in which:

FIG. 6A is a diagram showing a curved surface data memory provided in a curved surface calculator of the curved surface forming apparatus shown in FIG. 4;

FIG. 6B is a diagram showing a command list memory provided in a curved surface calculator of the curved surface forming apparatus shown in FIG. 4;

FIG. 7 is a diagram showing a circular or elliptical cylinder type vector field function;

FIG. 8 is a diagram showing a square cylinder type vector field function;

DETAILED DESCRIPTION OF THE PREFERRED EMBODIMENTS

Figure 1:
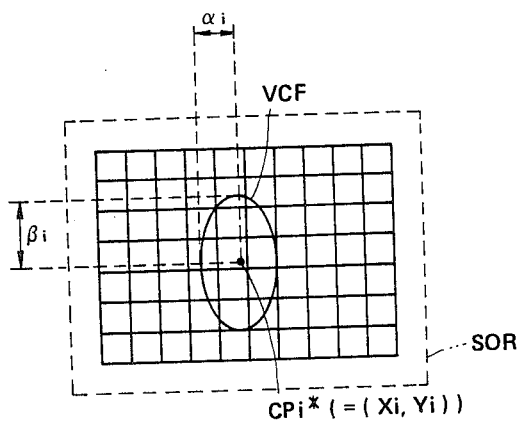
FIG. 1 is a diagram showing a source surface and a designation of an action point for assistance in explaining the principle of the method of forming a curved surface according to the present invention.
Figure 2:
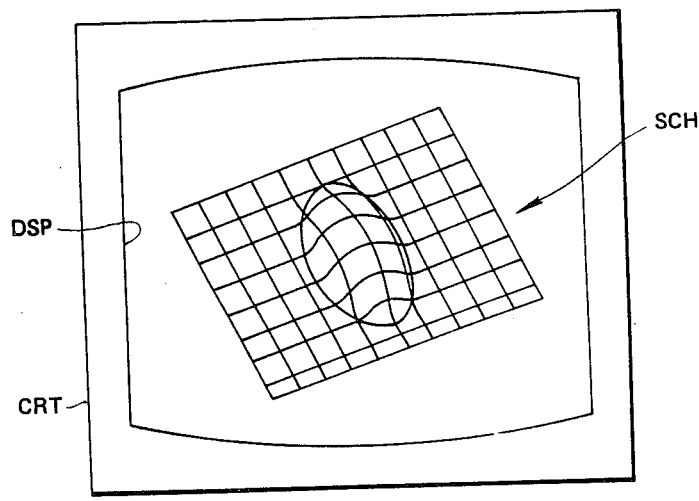
FIG. 2 is a diagram showing a curved surface on a display screen for assistance in explaining the principle of the method according to the present invention.

One embodiment of the present invention will be described in detail with reference to the attached drawings. As shown in FIG. 1, in the method of forming a curved surface according to the present invention, a position vector representative of an action point $CP_i^*$ is first designated on an original source surface SOR, and the deformation calculations for a curved surface are executed by a computer only within a deformation area (vector field) VCF including the action point $CP_i^*$. The calculated results are displayed as a deformed image SCH similar to that seen from any given visual point on a display screen DSP of a display unit CRT, as shown in FIG. 2.

The above deformation of a curved surface within the deformation area VCF is calculated recurrently on the basis of a deformation formula expressed by the following recurrence formula:

$$P_i^* = P_{i-1}^* + V_i^* * F_i(P_{i-1}^*, CP_i^*) \quad (1)$$

In the formula (1), $P_i^*$ denotes the position vectors representative of each point on a deformed curved surface newly formed in a three-dimensional space, each of which can be expressed by an addition of a position vector $P_{i-1}^*$ corresponding to a point located on a non-deformed curved surface SOR (prior to the deformation) to a deformation quantity $V_i^* * F_i(P_{i-1}^*, CP_i^*)$ from the position vector $P_{i-1}^*$ of the non-deformed curved surface.

This deformation quantity can be expressed by a position vector obtained by multiplying a vector field function $F_i(P_{i-1}^*, CP_i^*)$ by the deformation vector $V_i^*$.

Here, the deformation vector $V_i^*$ represents a direction and a quantity of deformation to be given to the original source surface SOR at the action point $CP_i^*$ as vector when the action point $CP_i^*$ is designated on the original non-deformed source surface SOR. By this, the original source surface SOR is deformed by raising the amount corresponding to the deformation vector $V_i^*$ at the action point $CP_i^*$.

Further, the vector field function $F_i(P_{i-1}^*, CP_i^*)$ is set at each point $P_{i-1}^*$ within the deformation area VCF determined, including the action point $CP_i^*$ (the quantity thereof can be designated by determining and inputting parameters), and represents a distribution of relative deformation rates to determine each relative degree of deformation in relation to the deformation at the action point $CP_i^*$. In this distribution of the relative deformation rates, the practical values exist only inside the deformation area VCF, reaching "0" at the periphery thereof. Further, the distribution is such a scalar quantity as to converge to zero.

Therefore, the deformation quantity $V_i^* * F_i(P_{i-1}^*, CP_i^*)$ is a position vector representative of a deformation quantity at each point within the deformation area VCF. The direction of this position vector is in parallel to the deformation vector $V_i^*$, and the quantity thereof is a value (scalar quantity) obtained by multiplying the quantity of the deformation vector $V_i^*$ by the value of the distribution of the relative deformation rate represented by the vector field function $F_i$. Therefore, the deformation of a curved surface in the deformation area VCF occurs at the action point $CP_i^*$ in the direction of the deformation vector $V_i^*$ with a quantity thereof, and the quantity thereof changes according to the change in the deformation rate of the vector field function $F_i$ in the direction of the deformation vector $V_i^*$ as the position approaches the periphery away from the action point $CP_i^*$.

Here, in the case where such a function as the Gaussian distribution function which gradually converges in symmetric relationship in proportion to the displacement from a central point to the outside has been assigned, for instance, it is possible to obtain a deformed surface such that the deformation quantity $V_i^* * F_i$ has its maximum value at the action point $CP_i^*$ in the direction of the vector $V_i^*$ and converges gradually to zero in the direction of the vector $V_i^*$ in proportion to the displacement from the action point $CP_i^*$ to the periphery.

As described above, the deformation quantity $V_i^* * F_i$ can be obtained by one deformation operation, and added to the original non-deformed position vector $P_{i-1}^*$ to obtain a deformed position vector $P_i^*$. Similarly, whenever the same deformation operation is repeated, the recurrence formula expressed by formula (1) is calculated in order to recurrently calculate the position vector representative of a deformed surface on the basis of the position vector representative of the non-deformed surface (prior to the deformation).

As a result of the recurrently repeated calculations as described above, the position vector representative of the final deformation point $P_N^*$ can be expressed as $$P_N^* = P_o^* + \sum_{i=1}^{N} V_i^* * F_i(P_{i-1}^*, CP_i^*) \quad (2)$$

The above position vector can be obtained by adding the position vector representative of the point $P_o^*$ on the original surface SOR prior to the start of deformation and the sum total (the total deformation quantity) of the deformation quantity obtained in sequence by the N-times of the deformation calculations (i=1 to N).

As described above, according to the formula (2), whenever the operator performs N times the deformation operations beginning from the point $P_o$ on the original surface SOR, the action point $CP_i^*$ is designated on the non-deformed curved surface and the positions required to deform from the non-deformed curved surface $P_{i-1}^*$ are freely designated on the basis of the operator's decision. Further, by re-designating the parameters for determining the vector field function $F_i$ and the deformation vector $V_i^*$, it is possible to freely set again the quantity of the deformation area VCF, the deformation rate distribution of the deformed curved surface, and the deformation direction on the basis of the operator's decision.

As described above, by executing the above deformation operation, the operator can repeatedly and recurrently perform the operations for deforming a non-deformed curved surface at a desired position, in a desired direction, and to a desired quantity.

As apparent from the formula (1), the position vectors $P_i^*$ of a deformed surface can be obtained on the basis of the position vector $P_{i-1}^*$ of a non-deformed surface by simply adding the deformation quantity $V_i^* * F_i$ to the position vector $P_{i-1}^*$ of the non-deformed surface. Therefore, it is possible to sufficiently increase the calculation speed in practice. On the other hand, with respect to the calculation to obtain the deformation quantity $V_i^* * F_i$, since the vector field function $F_i$ is determined in a way so as to converge to zero or to become zero as it goes to the periphery, it is possible to reduce the multiplication calculation time with respect to the deformation vector $V_i^*$ to such a short extent as to be assumable as real time processing in practice (1/30 sec or less according to experiments).

Therefore, in the method of forming a curved surface according to the present invention, whenever the operator performs the deformation operation, it is possible to display a deformed image on a display screen in real time in practice, and therefore to perform an image deformation operation in interactive fashion to the computer.

As described above with respect to formula (2), the deformation operation is repeated N times until the operator obtains the final deformation position vector $P_N^*$ beginning from the position vector $P_o^*$ on the original surface SOR, and the operator can repeatedly input deformation parameters in trial and error fashion.

Therefore, the operator can continue to perform the deformation operation while evaluating, for example, visually on a display screen, the result of deformation as to the curved surface obtained in accordance with the preceding deformation operation. In other words, whenever one operation has been completed, the operator can set the parameters, while considering "at which position", "in how wide", "in what direction", "in what quantity", at the succeeding operation for deformation, thus it is possible to readily obtain a curved surface nearest to the one required by the operator.

In the above-mentioned method of forming a curved surface, Gaussian distribution function can be used as the vector field function $F_i^*$ of the above formulas (1) and (2), and a circular or elliptic shape can be selected as the deformation area VCF in forming a curved surface of a human face, for instance. In this case, the vector field function $F_i$ is set to coordinates on a non-deformed source surface SOR, and the deformation position vectors $P_i^*(x, y)$ and $P_N^*(x, y)$ at a coordinate point (x, y) can be expressed by corresponding them to the formulas (1) and (2) as follows:

$$P_i^*(x, y) = P_{i-1}^*(x, y) + V_i^* * \mathrm{EXP}\left[-\left[\left(\frac{x - X_i}{\alpha i}\right)^2 + \left(\frac{y - Y_i}{\beta_i}\right)^2\right]\right] \quad (3)$$

$$P_N^*(x, y) = P_o^*(x, y) + \sum_{i=1}^{N} V_i^* * \mathrm{EXP}\left[-\left[\left(\frac{x - X_i}{\alpha i}\right)^2 + \left(\frac{y - Y_i}{\beta_i}\right)^2\right]\right] \quad (4)$$

Under these conditions, the vector field function $F_i$ can be expressed by $$F_i = \mathrm{EXP}\left[-\left[\left(\frac{x - X_i}{\alpha i}\right)^2 + \left(\frac{y - Y_i}{\beta_i}\right)^2\right]\right] \quad (5)$$

Figure 3:
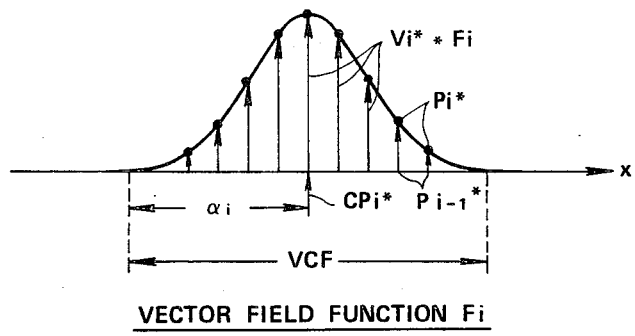
FIG. 3 is a diagram showing a vector field function $F_i$ for assistance in explaining a position vector representative of a deformed curved surface.

In the case of an ellipse having the action point ($X_i$, $Y_i$) on the x-y plane as a center and a diameter $\alpha_i$ in the x direction and a diameter $\beta_i$ in the y direction, the Gaussian distribution function is to be represented as shown in FIG. 3 in both the x and y directions.

In this case, the operator sets a coordinate ($X_i$, $Y_i$) as the parameter of an action point $CP_i^*$ and a diameter $\alpha_i$ in the x direction and a diameter $\beta_i$ in the y direction as the parameter of the deformation range VCF, all for the vector field function $F_i$, and further the parameter of the deformation vector $V_i^*$. Thus, the operator can obtain such a deformed curved surface as to gradually and smoothly converge down to the periphery at which the deformation rate is zero, along the Gaussian distribution curve changing with the deformation vector $V_i^*$ as its center and in parallel to the direction of the deformation vector $V_i^*$ raised at an action point ($X_i$, $Y_i$), within the circular or elliptic deformation area VCF having a center of the action point ($X_i$, $Y_i$) and diameters $\alpha_i$ and $\beta_i$.

The curved surface represented by the deformed position vector $P_i^*(x, y)$ or $P_N^*(x, y)$ is a smooth, free curved surface shown by the Gaussian distribution function in the direction of the deformation vector $V_i^*$, within a local area on the non-deformed original curved surface having the action point $CP_i^*$ at its center.

Therefore, it is possible to form such a natural, soft curved surface as to represent a human face; that is, it is possible to form a curved surface which does not produce unnaturalness.

Figure 4:
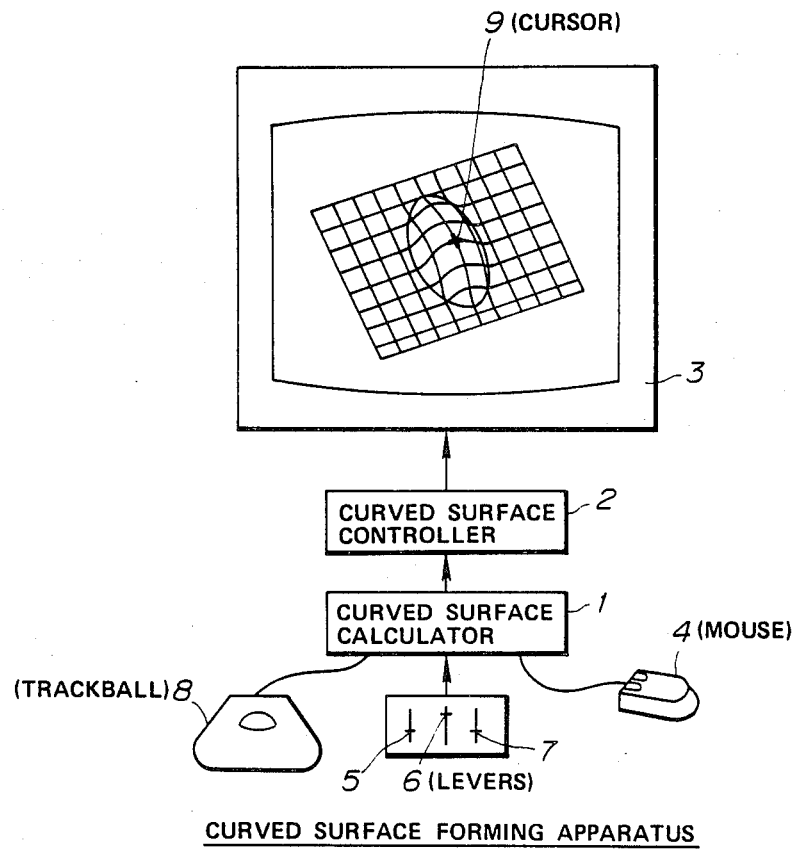
FIG. 4 is a schematic block diagram showing an embodiment of a curved surface forming apparatus for executing the method according to the present invention.

The method of forming a curved surface as described with reference to FIGS. 1 to 3 can be realized by a curved surface forming apparatus as shown in FIG. 4. Further, in this apparatus, the vector field function $F_i$ is so set as to provide a deformation rate distribution represented by a Gaussian distribution function within an elliptic deformation area.

In FIG. 4, the reference numeral 1 denotes a curved surface calculator, for example a computer, by which the position information obtained by the calculations in accordance with the formulas (3) and (4) is transformed into video signals through a curved surface display controller 2 before being displayed on a display unit 3 of cathode ray tube.

The curved surface calculator 1 is provided with peripheral input operation elements such as a mouse 4, levers 5, 6, and 7, and a trackball 8 for inputting parameters necessary to calculate the formula (3) and (4).

The mouse 4 is used to input parameters $X_i$, $Y_i$ for setting an action point $CP_i^*$ on the (x, y) plane, so that an action point ($X_i$, $Y_i$) can be designated in the formulas (3) and (4).

Further, the levers 5 and 6 are used to input parameters for determining the scope of the deformation area VCF, so that a diameter $\alpha_1$ in the x direction and a diameter $\beta_1$ in the y direction can be set in the formulas (4) and (5).

Furthermore, the lever 7 is used to set the transformation vector $V_i^*$, so that the direction and the height of the deformation vector $V_i^*$ can be set at the active point ($X_i$, $Y_i$), when switched by a selector button mounted on the mouse 4.

The trackball 8 sets a visual point with respect to the curved surface, so that a curved surface seen from a visual point set by the trackball 8 is displayed on the display unit 3. In this setting action, the trackball 8 can be switched by a selector button mounted on the mouse 4 so as to allow the visual point in three-dimensional manner.

After the various presetting operations have been completed by the use of the mouse 4 and the levers 5, 6, 7, the curved surface calculator 1 executes the calculations of the formulas (4) and (5). The calculated results are rotation-converted in accordance with the visual point information inputted through the trackball 8, and then displayed on the display unit 3 through the curved surface display controller 2. Therefore, on the screen of the display unit 3, a deformed curved surface is displayed in such a way as to rise at the middle portion thereof by a quantity according to the height of the deformation vector $V_i^*$ set by the lever 7 and in the direction thereof and converge to zero gradually in proportion as it approaches the periphery thereof, with an action point ($X_i$, $Y_i$) set by the mouse 4 as its center, within a deformation area VCF set by the levers 5 and 6.

Figure 5:
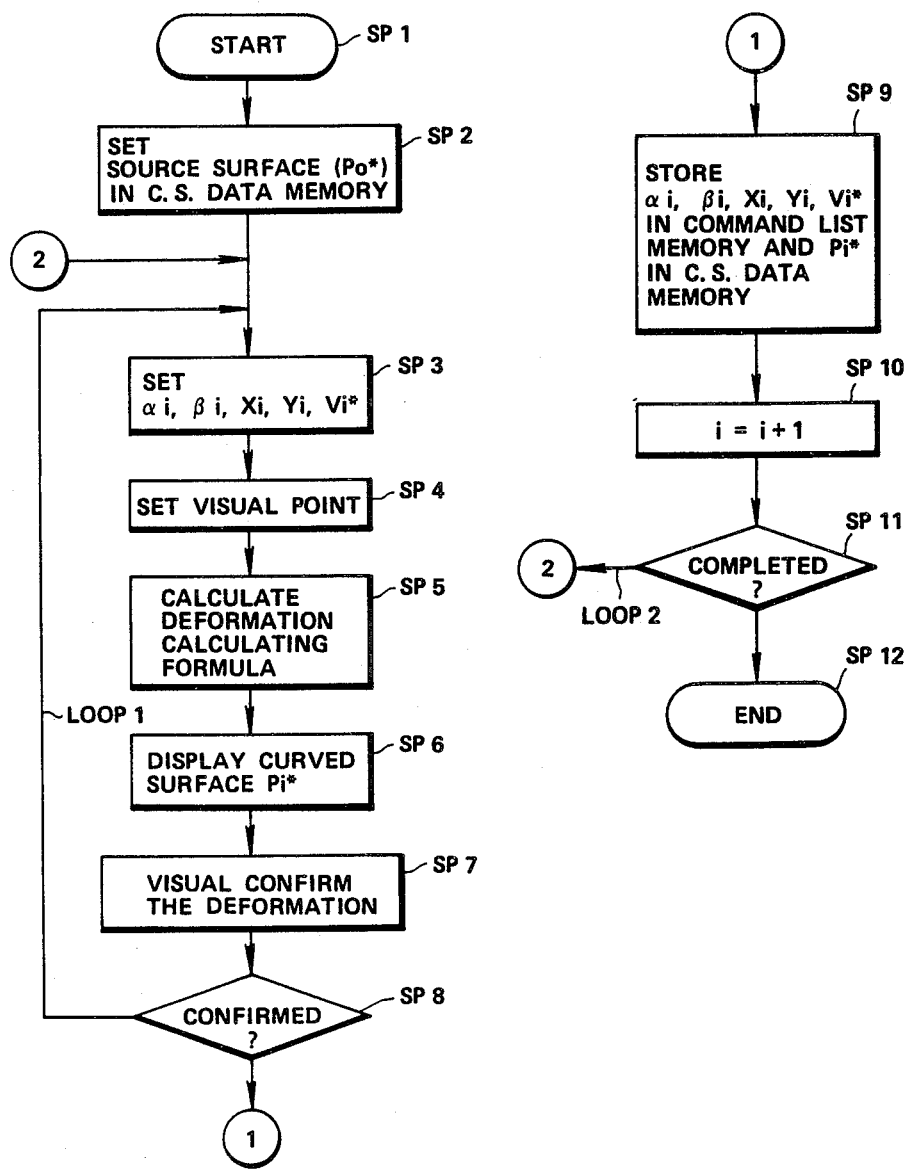
FIG. 5 is a flowchart showing the processing procedure of the curved surface deformation in the method according to the present invention.

The above-mentioned deformation operation can be obtained when the CPU of the curved surface calculator 1 executes the processing procedure as shown in FIG. 5.

That is to say, the CPU of the curved surface calculator 1 starts the processing procedure in step SP1 and then sets the position vector $P_o^*$ representative of an original source surface SOR in a curved surface data memory M2 (shown in FIG. 6A) provided for the curved surface calculator 1 in step SP2.

Subsequently, the control proceeds to the next step SP3 to read the parameters set by the operator. The operator has already inputted an action point data $X_i$, $Y_i$ through the mouse 4, diameter data $\alpha_i$ and $\beta_i$ through the levers 5 and 6, and transformation vectors $V_i^*$ through the lever 7 and the mouse 4.

The CPU of the curved surface calculator 1 reads a visual point data inputted through the trackball 8 in the succeeding step SP4 and then proceeds to step SP5.

In this step SP5, calculations are executed in accordance with the formula (3). In the calculations, the data stored in the curved surface data memory M2 are used as the position vector $P_{i-1}^*$ (x, y) prior to deformation, and the data set in step SP3 are used as each parameter $\alpha_i, \beta_i, X_i, Y_i,$ or $V_i^*$.

Subsequently, in step SP6 the curved surface calculator 1 displays a curved surface represented by the deformed position vectors $P_i^*$ calculated in step SP5 on the display unit 3 through the curved surface display controller 2.

Under these conditions, the CPU of the curved surface calculator 1 continues to display the curved surface $P_i^*$ and allows the operator to confirm in the succeeding step SP7 whether the degree of the deformation agrees with that required by the operator while watching the display on the display unit 3. Thereafter, the CPU proceeds to step SP8 to determine whether the operator inputs a confirmation signal.

Here, if a negative result is obtained, the CPU of the curved surface calculator 1 returns to the above step SP3 to wait for newly set parameters.

The operator sets again new parameters in steps SP3 and SP4; the deformation formula is calculated again in step SP5; the calculated curve is displayed again on the display unit 3 in step SP6; and the CPU allows the operator to check again whether the deformation degree agrees with the operator's request.

Therefore, the CPU of the curved surface calculator 1 allows the operator to repeatedly set the action point $CP_i^*$, the size of the deformation area VCF and the direction and the height of the deformation vector $V_i^*$, until the deformation agrees with the operator's request, along a loop of steps SP3, SP4, SP5, SP6, SP7, SP8, and SP3 again.

When the operator is satisfied with his own setting operation and inputs a setting completion signal to the curved surface calculator 1, as for example through a button switch on the mouse 4, the CPU of the curved surface calculator 1 proceeds to the next step SP9 to store the set data $\alpha_i, \beta_i, X_i, Y_i$ and $V_i^*$ in a parameter memory area N=1 (corresponding to the first setting operation) of a command list memory (FIG. 6B) M1 arranged also within the curved surface calculator 1. Thereafter, the CPU proceeds to step SP10 to add "+1" to the number i of operations (i.e. i=2), and then proceeds to step SP11.

This step SP11 is a step at which to check whether the operator has completed the deformation operation. When no operation end command is inputted by the operator, the CPU of the curved surface calculator 1 obtains a negative result in step SP11, and therefore returns to the above step SP3 to wait for the operator's second deformation operation (N=2).

Under these conditions, the operator can perform a second curved-surface deformation operation with respect to the curved surface already deformed in accordance with the first deformation operation under the operator's control. That is, the operator can execute again the deformation operation at another action point $CP_2^*$ different from the action point $CP_1^*$ determined by the first deformation operation so as to comply with his request.

That is to say, when the operator sets the parameters in steps SP3 and SP4, the curved surface calculator 1 executes the calculations of the position vector $P_2^*$ (x, y) in accordance with the formula (3) in step SP5 and displays the calculated curved surface on the display unit 3 in step SP6. This deformation operation can be repeated along the loop of steps SP3, SP4, SP5, SP6, SP7, SP8 and SP3 until the operator is satisfied with the displayed curved surface.

Further, once a deformation operation end has been confirmed by the operator in step SP8, the curved surface calculator 1 stores the newly input parameter data $\alpha_2, \beta_2, X_2, Y_2, V_2^*$ in a parameter memory area N=2 (corresponding to the second presetting operation) of the command list memory M1 in step SP9, adds "+1" to the number i of operations (i.e. i=3) in step SP10, and proceeds to step SP11.

In the same way, whenever the operator performs a new deformation operation, the CPU of the curved surface calculator 1 executes the above-mentioned deformation processing loop of SP3, SP4, SP5, SP6, SP7, SP8, and SP3, stores the set parameter data in the command list memory M1, and stores the position vector $P_i^*$ obtained by the deformation calculation in the curved surface data memory M2 for updating the data. Therefore, a curved surface $P_N^*$ (x, y) (formula 4) formed by the N-time deformation operations can be obtained in the curved surface data memory M2. When the operator has completed all the deformation processings, the CPU of the curved surface calculator 1 proceeds to step SP1 to complete the program.

Therefore, in the curved surface forming apparatus as shown in FIG. 4, the operator can execute the deformation processing of a curved surface by inputting deformation parameters to the curved surface forming apparatus 1 through the mouse 4, the levers 5, 6, and 7 and the trackball 8 whenever the operator performs the deformation operation once. Further, since the calculation time required for the deformation on the basis of the above-mentioned formula (1) and (2) or (3) and (4) is as short as about 0.3 sec, the deformation results can be displayed on the display screen of the display unit 3 immediately after the operator has completed the deformation operation. Further, the operator can select and input such parameters as to be able to deform a part of a non-deformed curved surface to a desired form where necessary. That is to say, as a whole, the operator can form a desired curved surface by locally modifying a surface into a desired curved surface in an interactive fashion to the apparatus.

Since the curved surface forming apparatus as shown in FIG. 4 is provided with a command list memory M1 as shown in FIG. 6B, it is possible to reproduce the preceding curved surfaces executed by the preceding deformation operations, by reading parameters used for the preceding deformation processing on the basis of the present latest deformation position vector $P_N^*$ (formula 4) stored in the curved surface data memory M2, by calculating the deformation quantity obtained by the preceding deformation operation, and by subtracting the deformation quantity from the data stored in the curved surface data memory M2. In other words, since one frame is sufficient in the curved surface data memory M2, the curved surface forming apparatus is simple in structure as the whole.

In the configuration as described above, when the parameters stored in the command list memory M1 are read in the reverse order, and the reverse transformation calculations are made together with the finally obtained curved surface, it is possible to display on the display unit 3 the change process of curved surfaces by reproducing the progress up to the present deformed curved surface in the reverse order. In addition, when the parameters stored in the command list memory M1 are read from the memory area N=1 in the normal order to obtain the deformation data, and the transformation calculations are made together with the curved surface data $P_o$* on the source surface SOR, it is possible to reproduce the progress up to the finally obtained deformed curved surface in the forward order. Therefore, in the course of forming a desired free curved surface, the operator can study the contents of deformation to be performed in the feature with reference to the already-executed deformation operations. As a result, it is possible to realize a curved surface forming apparatus easy to operate when the operator forms a free curved surface.

The apparatus is so constructed that the parameters stored in the command list memory M1 can be set on the basis of the coordinates on the source surface SOR; that is, the vector field function is set to the coordinates on the source surface SOR without setting it to the coordinates on the position vector representative of non-deformed surface $P_{i-1}$*. Since all the N-time deformations from i=1 to i=N are transformable, it is possible to eventually reproduce the finally-obtained deformed curved surface even if the order of reading the parameters from the command list memory M1 is changed at the operator's option. As described above, if the parameters are read from the memory in accordance with a procedure different from that when the parameters are stored in the command list memory M1, it is possible to confirm that there are various deformed curved surfaces until the presently formed curved surface has been obtained. Since the above features provide the operator with reference materials when he forms a new free curved surface, it is possible to realize an easy way to operate a curved surface forming apparatus.

In addition to the above-mentioned two forward and reverse transformation operations, the other way to reproduce deformed curved surfaces on the basis of data read out of the command list memory M1 is as follows: parameter values of the transformation step numbers N are not read out of the memory continuously in order but are read at random so as to change without order. In this case, it is possible to obtain diverse deformed curved surfaces on the basis of data stored in the command list memory M1 when the operator wants to form a new free curved surface.

As described above, since the parameters in the command list memory M1 are formed on the basis of the coordinates on the original source surface SOR, it is possible to independently rewrite a part of the parameters already stored in the command list memory M1 without providing a change in the deformation effect of the other parameters. Therefore, the present invention is suitable for the case when a plane image such as a human face, for instance, should be expressed stereographically.

In the above-mentioned embodiment, when the operator is not satisfied with a deformation at specified coordinates on the source surface SOR, he can rewrite the value to a desired value. Even in this case, the rewritten value does not exert a harmful influence upon the deformation effect of the parameters stored based upon the other deformation operations with respect to the other coordinate positions. Therefore, when performing a complicated deformation operation, the operator can repeat the deformation operations one by one, while watching the whole deformed picture, until he is satisfied with the deformed image. Thus, it is possible to obtain a curved surface forming apparatus easy to handle from this point of view.

In the above-embodiment, a Gaussian distribution function (formula 5) has been explained as the vector field function $F_i$ in formulas 3 and 4. However, without being limited to this Gaussian function, it is possible to adopt various functions as described below. When the curved surface forming apparatus is so constructed as to be able to select various vector field functions $F_i$, it is possible to sequentially change over the deformation calculation formula (step SP5) in the deformation processing loop of SP3, SP4, SP5, SP6, SP7, SP8 and SP3 described with reference to FIG. 5. Therefore, the operator can form an optimum curved surface agreeing with the operator's demand by deforming a curved surface in combination with various deformed curved surfaces having various characteristics. This switching-over of deformed curved surfaces results in an effect similar to that obtained on an engraved surface by using a sequence of engraver's tools having different edges of blades.

FIG. 7 shows the case where a vector field function $F_i$ representative of external surfaces of a right cylinder having a circle or an ellipse in a deformation area VCF on the (x, y) plane is used. If $$\left(\frac{x}{a}\right)^2 + \left(\frac{y}{b}\right)^2 \leq 1 \quad (6)$$

the vector field function is $$F_i = 1 \quad (7)$$

and, if $$\left(\frac{x}{a}\right)^2 + \left(\frac{y}{b}\right)^2 > 1 \quad (8)$$

the vector field function is $$F_i = 0 \quad (9)$$

Where the vector field function $F_i$ as shown in FIG. 7 is adopted, it is possible to obtain a deformed curved surface having a shape near to a right circular cylinder surface having a distribution such that the deformation quantity is at its maximum in the deformation area VCF and zero along the periphery thereof. Therefore, any desired curved surface can be formed by repeating the deformation operation while dividing the deformation area into a small area.

FIG. 8 shows an embodiment where a vector field function $F_i$ representative of a right cylinder having a rectangle in the deformation area VCF on the (x, y) plane is used. In this case, if $$-a \leq x \leq a \ldots \quad (10)$$

$$-b \leq y \leq b \ldots \quad (11)$$

in both the x axis and y axis directions, the vector field function is $$F_i = 1 \ldots \quad (12)$$

In contrast with this, with respect to an area other than the deformed area VCF, if $$-a \leq x \leq a \ldots \quad (13)$$

$$y < -b, y > b \ldots \quad (14)$$

the vector field function is
$$F_i = 0 \ldots \quad (15)$$

Further, if $$x < -a, x > a \ldots \quad (16)$$

$$-b \leq y \leq b \ldots \quad (17)$$

the vector field function is $$F_i = 0 \ldots \quad (18)$$

Furthermore, if $$x < -a, x > a \ldots \quad (19)$$

$$y < -b, y > b \ldots \quad (20)$$

the vector field function is $$F_i = 0 \ldots \quad (21)$$

Where the vector field function $F_i$ as described above is used, it is possible to locally deform a curved surface on the basis of deformation surfaces of a rectangular cylinder.

Figure 9:
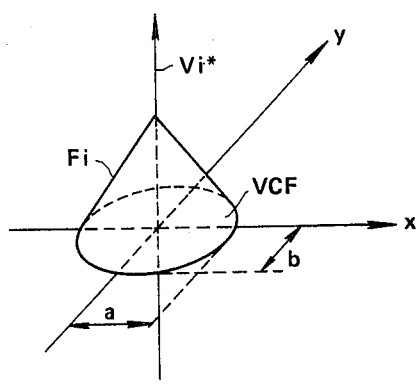
FIG. 9 is a diagram showing a circular or elliptical cone type vector field function.

FIG. 9 shows an embodiment where a function representative of the surface of a circular cone or an elliptic cone having a circle or an ellipse on the (x, y) plane is used as the vector field function $F_i$. If $$\left(\frac{x}{a}\right)^2 + \left(\frac{y}{b}\right)^2 \leq 1 \quad (22)$$

the vector field function $F_i$ is $$F_i = \left(1 - \sqrt{\left(\frac{x}{a}\right)^2 + \left(\frac{y}{b}\right)^2}\right) \quad (23)$$

and if $$\left(\frac{x}{a}\right)^2 + \left(\frac{y}{b}\right)^2 > 1 \quad (24)$$

the vector field function is $$F_i = 0 \quad (25)$$

Therefore, a deformed curved surface can be deformed in accordance with the deformation curved surface of the cone surface expressed by the formula (23) within the deformation area VCF expressed by the formula (22). In the above distribution of the deformation rate, the change quantity is at its maximum at the center of the deformation area VCF and converges to zero as it approaches the periphery thereof.

Figure 10:
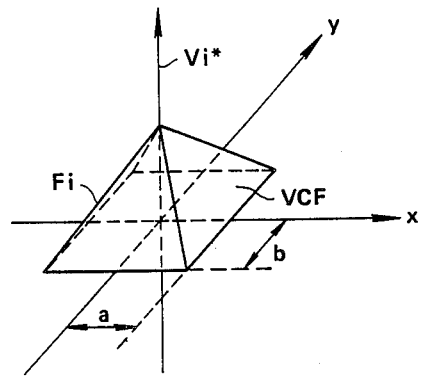
FIG. 10 is a diagram showing a square cone type vector field function.

FIG. 10 shows an embodiment where a function representative of external surfaces of a rectangle pyramid formed in the deformation area VCF on the (x, y) plane is used as the vector field function $F_i$. In this case, if $$-a \leq x \leq a \ldots \quad (26)$$

$$-b \leq y \leq b \ldots \quad (27)$$

the vector field function $F_i$ is $$F_i = \left(1 - \frac{x}{a}\right)\left(1 - \frac{y}{b}\right) \quad (28)$$

In contrast with this, with respect to an area other than the deformation area VCF, if $$-a \leq x \leq a \ldots \quad (29)$$

$$y < -b, y > b \ldots \quad (30)$$

the vector field function is $$F_i = 0 \ldots \quad (31)$$

Further, if $$x < -a, x > a \ldots \quad (32)$$

$$-b \leq y \leq b \ldots \quad (33)$$

The vector field function is $$F_i = 0 \ldots \quad (34)$$
Further, if $$x < -a, x > a \ldots \quad (35)$$

$$y < -b, y > b \ldots \quad (36)$$

the vector field function is $$F_i = 0 \ldots$$
(37)

In the case of this embodiment, it is possible to deform a curved surface into another curved surface by the use of a deformable curved surface having an external surface of a pyramid.

Figure 11:
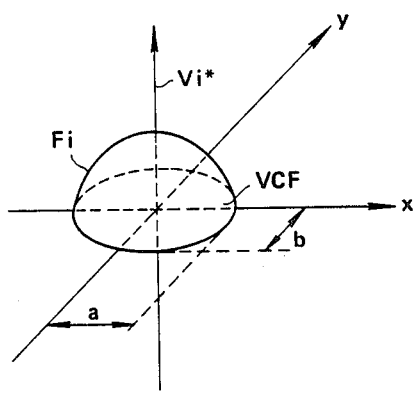
FIG. 11 is a diagram showing a spherical type vector field function.

FIG. 11 shows an embodiment where a function representative of a spherical surface having a circular or elliptical shape on the (x, y) plane is used as the vector field function $F_i$. In this embodiment, in the deformation area VCF represented by $$\left(\frac{x}{a}\right)^2 + \left(\frac{y}{b}\right)^2 \leq 1 \tag{38}$$

the vector field function is $$F_i = \sqrt{1 - \left(\left(\frac{x}{a}\right)^2 + \left(\frac{y}{b}\right)^2\right)} \tag{39}$$

With respect to the area other than VCF, if $$\left(\frac{x}{a}\right)^2 + \left(\frac{y}{b}\right)^2 > 1 \tag{40}$$

the vector field function is $$F_i = 0 \ldots \tag{41}$$

Therefore, it is possible to relatively softly deform a curved surface on the basis of a deformed curved surface having an external shape of a sphere.

Figure 12:
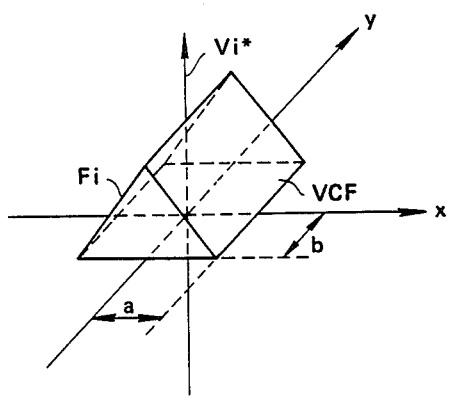
FIG. 12 is a diagram showing a prism type vector field function.

FIG. 12 shows an embodiment where a function representative of external surfaces of a triangular prism having a rectangle shape in the deformation area VCF on the (x, y) plane is used as the vector field function $F_i$. If $$-a \leq x \leq a \ldots \tag{42}$$

$$-b \leq y \leq b \ldots \tag{43}$$

the vector field function is $$F_i = \left(1 - \frac{x}{a}\right) \tag{44}$$

In contrast with this, with respect to other regions as $$-a \leq x \leq a \ldots \tag{45}$$

$$y < -b, y > b \ldots \tag{46}$$

the vector field function is $$F_i = 0 \ldots \tag{47}$$

Further, if $$x < -a, x > a \ldots \tag{48}$$

$$-b \leq y \leq b \ldots \tag{49}$$

the vector field function is $$F_i = 0 \ldots \tag{50}$$

Further, if $$x < -a, x > a \ldots \tag{51}$$

$$y < -b, y > b \ldots \tag{52}$$

the vector field function is $$F_i = 0 \ldots \tag{53}$$

Therefore, it is possible to deform a curved surface into another curved surface by the use of a curved surface having the external surface of a prism with the edge lines extending in the y axis direction.

As described above, it is possible to provide variation in curved surface deformations by applying various functions to the vector field function. In addition, the above-mentioned variation can further be increased by the method described below.

It is also possible to obtain the final deformation position vector $P_i^*$ by substituting the vector $P_i^*$ obtained by the deformation processing in accordance with the formula (1) with a preliminary deformation position vector $P_{D(i-1)}^*$ and further by position-transforming this preliminary deformation position vector $P_{D(i-1)}^*$ on the basis of a position transformation function $P_{EX(i-1)}^*$. This is the method of further increasing the degree of freedom in deformation operation by adding the position transformation based upon the position transformation function $P_{EX(i-1)}^*$ to the already-mentioned deformation operation.

In more detail, a preliminary deformation position vector expressed as $$P_{D(i-1)}^* = P_{i-1}^* + V_i^* * F_i(P_{i-1}^*, CP_i^*) \tag{54}$$

can be obtained by the deformation processing method in accordance with the formula (1). Further, by adding a position transformation function expressed as $$P_{EX(i-1)}^* = J * (P_{i-1}^* - CP_i^*) * F_{EX}(P_{i-1}^*, CP_i^*) \tag{55}$$

to the above preliminary deformation position vector $P_{D(i-1)}^*$, it is possible to obtain a position vector $P_i^*$ representative of a final deformed curved surface expressed as follows:

$$\begin{aligned} P_i^* &= P_{D(i-1)}^* + P_{EX(i-1)}^* \\ &= (P_{i-1}^* + V_i^* * F_i(P_{i-1}^*, CP_i^*)) + \\ &\quad J * (P_{i-1}^* - CP_i^*) \\ &\quad * F_{EX}(P_{i-1}^*, CP_i^*) \end{aligned} \tag{56}$$

Figure 13:
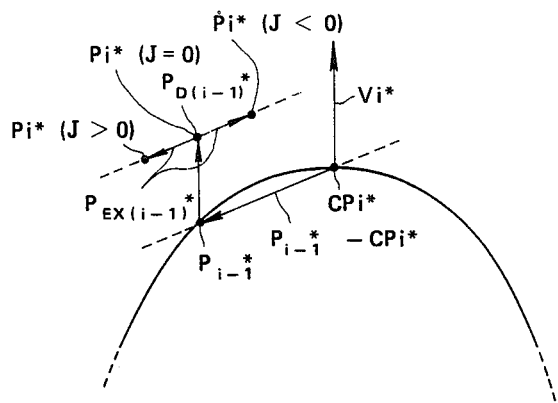
FIGS. 13 and 14 are diagrams for assistance in explaining position transformation functions adopted in forming a curved surface according to the present invention.
Figure 14:
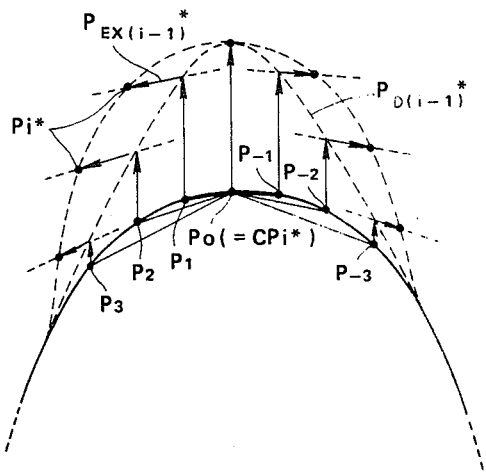

When the calculations as expressed by the formulas (54) to (56) are executed, the position vector $P_i^*$ representative of a deformed curved surface moves from a non-transformed position vector $P_{i-1}^*$ to positions as shown in FIGS. 13 and 14.

That is to say, when a deformation point $P_{i-1}^*$ is designated in relation to an action point $CP_i^*$, the preliminary deformation position vector $P_{D(i-1)}^*$ is raised in the direction parallel to the deformation vector $V_i{}^*$ by the second term of the formula (54), as shown in FIG. 13.

In contrast with this, the position transformation function $P_{EX(i-1)}{}^*$ has a vector having a direction parallel to the differential vector $(P_{i-1}{}^* - CP_i{}^*)$ and a quantity obtained by multiplying the differential vector by a vector field function $F_{EX}(P_{i-1}{}^*, CP_i{}^*)$ and a position transformation coefficient J, as shown in formula (55).

Here, the vector field function $F_{EX}(P_{i-1}{}^*, CP_i{}^*)$ represents a relative position transformation rate allocated to each deformation point within the deformation area VCF. Therefore, the position transformation function $P_{EX(i-1)}{}^*$ can be obtained by multiplying the differential vector $(P_{i-1}{}^* - CP_i{}^*)$ by the value determined by the vector field function $F_{EX}(P_{i-1}{}^*, CP_i{}^*)$ such as to converge to zero toward the circumferential portion with the action point $CP_i$ as its center.

In contrast with this, the position transformation coefficient J can take zero, positive values, or negative values. If $J=0$, since the position transformation function $P_{EX(i-1)}{}^*$ is zero, the final curved surface position $P_i$ becomes $P_{D(i-1)}{}^*$ on the basis of formula (56). Thus, a position not subjected to a position transformation based upon the preliminary deformation position vector $P_{D(i-1)}{}^*$ becomes the position of the final position vector $P_i{}^*$.

In contrast, if the value of the position transformation coefficient J is positive, as the position of the final position vector $P_i{}^*$, the position transformation function $P_{EX(i-1)}{}^*$ determines the position transformed in the direction away from the action point $CP_i{}^*$ with the preliminary deformation position vector $P_{D(i-1)}{}^*$ as its basis in the direction parallel to the differential vector $(P_{i-1}{}^* - CP_i{}^*)$ representative of the position of a deformation point $P_{i-1}{}^*$ relative to the action point $CP_i{}^*$, as shown in FIG. 13.

Conversely, if the value of the position transformation function J is negative, the position transforming function $P_{EX(i-1)}{}^*$ has a vector approaching the action point in parallel to the differential vector $(P_{i-1}{}^* - CP_i{}^*)$, and the position vector $P_i{}^*$ representative of the final deformed curved surface is transformed into a position approaching the action point $CP_i{}^*$ with the preliminary deformation position vector $P_{D(i-1)}{}^*$ as its basis.

As described above, when the direction and the quantity of the position transformation are determined at each deformation point $P_1, P_2, P_3, \ldots$ or $P_{-1}, P_{-2}, P_{-3}, \ldots$ with the action point $CP_i{}^*$ as its center, as shown in FIG. 14, on the basis of the position transformation function $P_{EX(i-1)}{}^*$, the position vector $P_i{}^*$ obtained after deformation can be controlled by controlling the value of the position transformation coefficient J and by selecting the vector field function $F_{EX}(P_{i-1}{}^*, CP_i{}^*)$ as needed in the formula (55). As a result, it is possible to form a curved surface having a different position vector even if the same pattern position is designated as the deformation point, $P_{i-1}{}^*$ within the deformation area VCF.

That is to say, even if the same deformation point is designated as when a non-deformed free curved surface is deformed in a local deformation area VCF in accordance with the basic method already mentioned with reference to formula (1), it is possible to form different free curved surfaces according to the way of selecting the parameters of the position transformation function $P_{EX(i-1)}$. Thus, it is possible to realize a curved surface forming apparatus having a large degree of freedom when the operator wants to form any desired free curved surface.

Here, as described in accordance with the formulas (3) and (4), in the case where a deformation point $P_{i-1}{}^*$ (x, y) designated on the (x, y) coordinates in a deformation area VCF is used in obtaining the deformation position vector $P_i{}^*$, the x direction and y direction position transformation formulas as expressed by the following transformation functions $$X_{EX(i-1)} = J \circ (x - X_i) \qquad (57)$$
$$\ast \text{EXP}\left(-\left(\left(\frac{x - X_i}{\alpha_{oi}}\right)^2 + \left(\frac{y - Y_i}{\beta_{oi}}\right)^2\right)\right)$$

$$Y_{EX(i-1)} = J \circ (y - Y_i) \qquad (58)$$
$$\ast \text{EXP}\left(-\left(\left(\frac{x - X_i}{\alpha_{oi}}\right)^2 + \left(\frac{y - Y_i}{\beta_{oi}}\right)^2\right)\right)$$

can be adopted as the position transformation function $P_{EX(i-1)}{}^*$ ($x_{EX(i-1)}$, $y_{EX(i-1)}$) of the formula (55).

These position transformation functions $X_{EX(i-1)}$ and $Y_{EX(i-1)}$ describe a Gaussian distribution curve with the action point $CP_i{}^*$ ($X_i$, $Y_i$) as its center within the deformation area VCF of an ellipse having diameters $\alpha_{oi}$ and $\beta_{oi}$ in the x and y directions, as a vector field function $F_{EX}$ in the formula (55).

Further, in this case, a position vector from the action point $CP_i{}^*$ ($X_i$, $Y_i$) to the deformation point $P_{i-1}{}^*$ (x, y) is taken as the differential vector $P_{i-1}{}^* - CP_i{}^*$ in the formula (55).

By this, it is possible to obtain transformation position information such that the curved surface position is shifted in such a way as not to move or to diverge or to converge by the quantity of the position transformation function $P_{EX(i-1)}{}^*$ beginning from the preliminary deformation position vector $P_{D(i-1)}{}^*$ corresponding to the input position (x, y) of the deformation point $P_{i-1}{}^*$ (x, y), by selecting the value and the sign of the position deformation coefficient J to zero, positive or negative values in the position transformation functions $x_{EX(i-1)}$ and $y_{EX(i-1)}$.

On the basis of the above-mentioned position transformation method, it is possible to deform a surface, at the same deformation point within the deformation area VCF, into different curved surfaces according to the way of selecting the parameters. With respect to this point, only the transformation function of the x direction component $x_{EX(i-1)}$ will be studied in further detail hereinbelow in the position transformation function $P_{EX(i-1)}{}^*$.

In this embodiment, the diameters $\alpha_{oi}$, $\beta_{oi}$ of the position transformation function $P_{EX(i-1)}{}^*$ are selected to have values equal to those $\alpha_i$, $\beta_i$ of the deformation area VCF.

First, if $J=0$ in the formula (57), the position transformation function $x_{EX(i-1)}{}^*$ is $$x_{ER(i-1)} = 0 \ldots \qquad (59)$$

This implies that the pattern at the deformation point designated on the x coordinate axis is mapped onto the $x_{EX(i-1)}$ coordinate axis as it is within the deformation area VCF.

Therefore, when the position transformation coefficient J is zero, if a deformation point is designated on the deformation area VCF in order to form a free curved surface represented by the position vector $P_i^*$ of the formula (56), the position vector $P_i^*$ can be obtained on the basis of only the calculation results of the preliminary deformation position vector $P_{D(i-1)}$ of the formula (54) with respect to the designated deformation position. As a result, as shown in FIG. 15, a non-deformed curved surface $P_{i-1}^*$ can be deformed in the deformation area VCF so as to describe a Gaussian distribution curve determined by the vector field function $F_i$ of the formula (5).

However, if the position deformation coefficient J is set to a negative value in the formula (57), the position transformation function $x_{EX(i-1)}$ executes such a calculation as to shift the position vector $P_i^*$ in the direction of convergence to zero from the position of the preliminary deformation position vector $P_{D(i-1)}^*$ deformed on the basis of the value x designated as a deformation point, in accordance with the second-term position transformation function $P_{EX(i-1)}^*$ of the formula (56).

Figure 15:
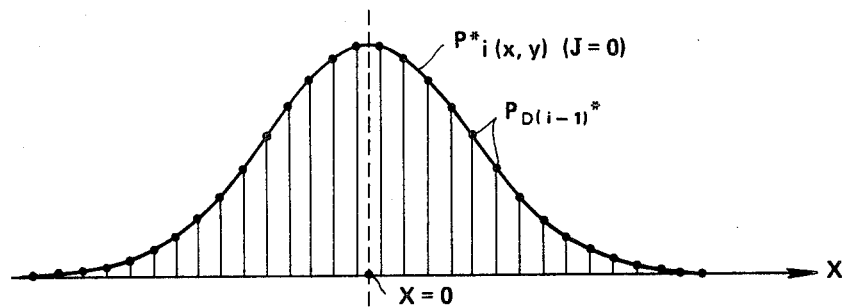
FIGS. 15 to 17 are diagrams showing some examples of characteristic curves adoptable to deformed curved surfaces in the position transformation method according to the present invention.
Figure 16:
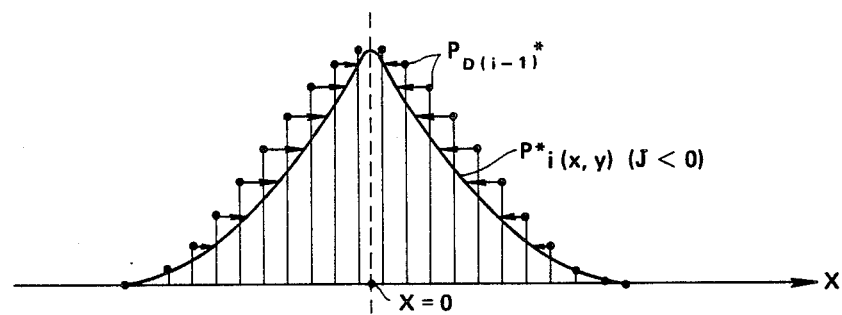

As a result, as shown in FIG. 16, the pattern at the deformation point designated on the x coordinate axis is so mapped as to become a pattern contracted in the direction of the action point $CP_i^*$ as the position vector $P_i^*$ on the deformed curved surface.

Where a deformation position pattern which is the same as in FIG. 15 is given on the x coordinate axis, which is different from the deformation position vector $P_i^*$ (x, y) which describes a Gaussian distribution curve as shown in FIG. 15, the deformation position vector $P_i^*$ (x, y) is formed in such a way that as shown in FIG. 16, the Gaussian distribution curve is contracted along the x-direction with the action point (x=0) as its center.

Figure 17:
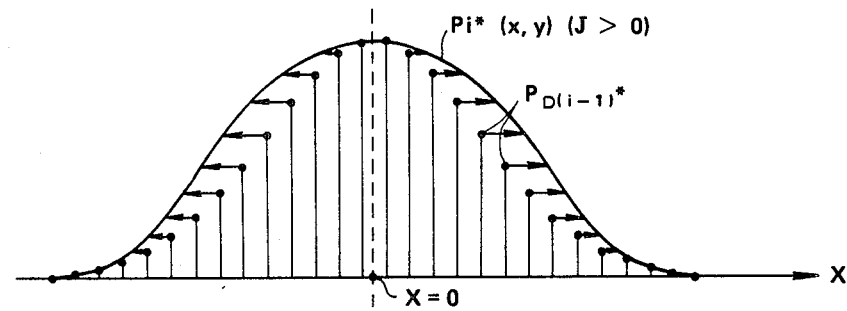

In contrast with this, if the position transformation coefficient J of the formula (57) is set to a positive value, the deformation position function $x_{EX(i-1)}$ shifts the position vector $P_i^*$ outside away from the preliminary deformation position vector $P_{D(i-1)}^*$ corresponding to the deformation position x with the action point (x=0) as its center. As a result, when the position pattern at the deformation point is designated on the x-coordinate axis, the position pattern is mapped onto the position vector $P_i^*$ on the deformed curved surface, as a pattern which expands outside with the action point (x=0) as its center, as shown in FIG. 17.

The deformation position vector $P_i^*$ (x, y) obtained when the same position information as in FIG. 15 is given on the x coordinate axis does not describe the Gaussian distribution curve as in FIG. 15, but describes such a deformed curved surface that the Gaussian distribution curve is expanded in the outward direction with the action point (x=0) as its center.

As described above, since the preliminary deformation position vector $P_{D(i-1)}^*$ obtained on the basis of the position information x as to the deformation point on a non-deformed curved surface is shifted by a transformation quantity obtained by the position transformation function $x_{EX(i-1)}^*$ of the formula (57) in order to obtain a deformed position vector $P_i^*$, when the value of the position transformation coefficient J is selected to have a value of zero, negative or positive, it is possible to freely form various deformed curved surfaces expanded outward or contracted inward with the action point of this basic deformed curved surface as its center, in addition to the basic deformed curved surface obtained in accordance with a given position information, even if the same deformation position information is given.

Further, since the degree of expansion and contraction can freely be selected by changing the value of the position transformation coefficient J, it is possible to form free curved surfaces of various shapes ranging from a deformed curved surface having a relatively sharp top end to a deformed curved surface expanded into a truncated shape.

In the above description, although the position transformation function of only the x direction component $x_{EX(i-1)}$ expressed by the formula (57) has been explained with respect to the position transformation function $P_{EX(i-1)}^*$, as to the y direction component $Y_{EX(i-1)}$ expressed by the formula (58), it is possible to obtain various deformed curved surfaces different in the y-axis direction by selecting the value of the position transformation coefficient J at the operator's option. That is to say, various deformed curved surfaces can be formed in the two-dimensional x-y coordinate deformation area VCF on a non-deformed curved surface. According to experiments, it has been confirmed that it is possible to form various deformed curved surfaces $P_i^*$ (x, y) obtained by locally deforming a non-deformed curved surface, as shown in FIGS. 18, 19 and 20, on the basis of the above-mentioned embodiment.

Figure 18:
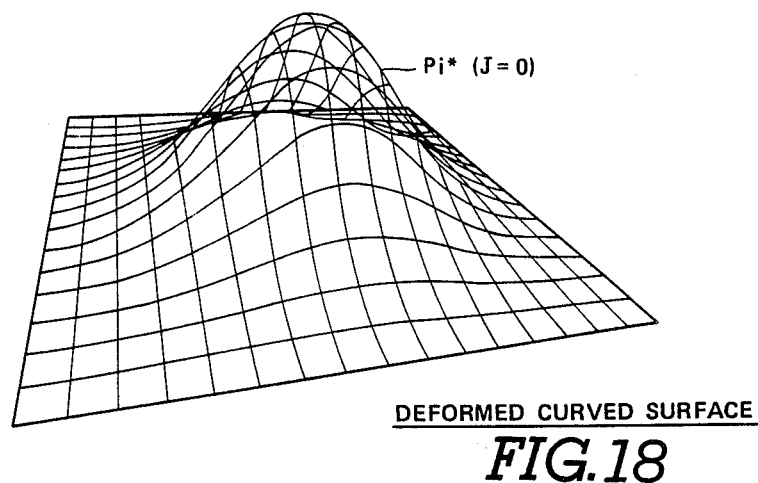
FIGS. 18 to 20 are perspective views showing some examples of curved surfaces formed by the method according to the present invention, in wire frame fashion.

FIG. 18 shows a deformed curved surface obtained when the position transformation coefficient J is set to zero in the formulas (57) and (58). The position vector $P_i^*$ (x, y) representative of the deformed curved surface has a Gaussian distribution curved surface.

Figure 19:
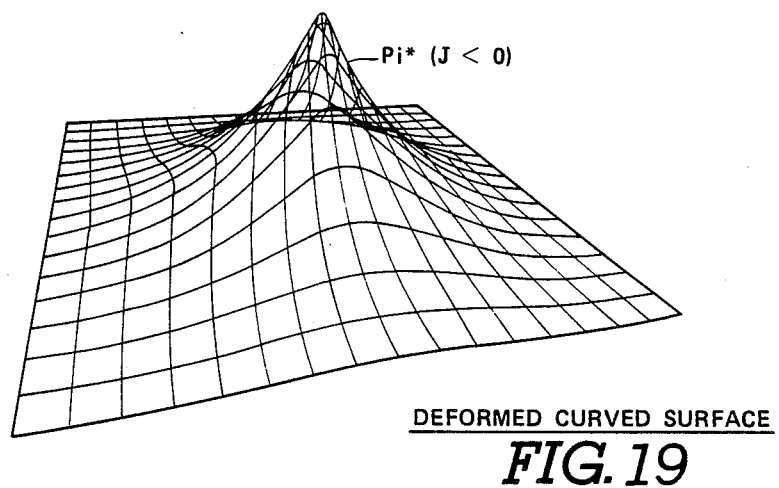

FIG. 19 shows the case where a negative value is set to the position transformation coefficient J. The position vector $P_i^*$ (x, y) representative of the deformed curved surface of this case gives a curved surface having a greater sharpness at the action point (x=0, y=0), as compared with the deformed curved surface shown in FIG. 18.

Figure 20:
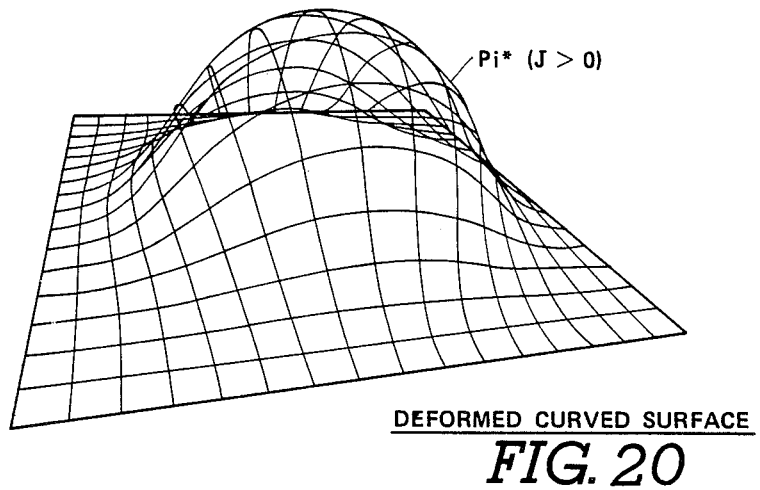

FIG. 20 shows a deformed curved surface $P_i^*$ (x, y) obtained when a positive value is set to the position transformation coefficient J. As compared with the basic deformed curved surface shown in Fig. 18, the curved surface is deformed so as to be rounded near the action point (x=0, y=0).

In the above description, the degree of freedom of curved surface deformation can be increased by adding the position transformation function $P_{EX(i-1)}^*$ to the deformation obtained in accordance with the formula (1). However, in the succeeding embodiment, the degree of freedom of curved surface deformation can be increased in such a way that the non-deformed position vector $P_{i-1}^*$ is position-transformed by a position transformation function $P_{o(i-1)}^*$ and then deformed in the usual manner in accordance with the vector field function of the formula (1).

In more detail, in the formula (1), the non-deformed position vector $P_{i-1}^*$ is directly used as the position information in setting the vector field function $F_i$. However, in place of the above vector, a position transformation function $P_{o(i-1)}^*$ is used so as to be expressed by the following formula:

$$P_i^* = P_{i-1}^* + V_i^\circ * F_i(P_{o(i-1)}^*, CP_i^*) \qquad (60)$$

This position transformation function $P_{o(i-1)}^*$ is expressed as $$P_{o(i-1)}^* = P_{i-1}^* + K * (P_{i-1}^* - CP_i^*) * F_o(P_{i-1}^*, CP_i^*) \qquad (61)$$

In this formula (61), a transformation vector M* represented by the second-term transformation formula as $$M^* = K * (P_{i-1}^* - CP_i^*) \quad (62)$$
$$* F_o (P_{i-1}^*, CP_i^*)$$

is added to the first non-deformed position vector $P_{i-1}^*$.

The above transformation vector M* is obtained by making a vector product of the vector field function $F_o (P_{i-1}^*, CP_i^*)$ and the differential vector $(P_{i-1}^* - CP_i^*)$ and then by multiplying the calculated result by a position transformation coefficient K of scalar quantity.

Here, when the non-deformed position vector $P_{i-1}^*$ is designated at the action point $CP_i$ in the same deformation area VCF as in the vector field function $F_i$ of the formula (60), the vector field function $F_o (P_{i-1}^*, CP_i^*)$ has a scalar quantity which changes according to the designated position. Therefore, when the position vector $P_{i-1}^*$ is designated within the deformation area VCF, the position transformed on the basis of the position transformation function $P_{o(i-1)}^*$ is used as the position information of the vector field function $F_i$.

Further, in the transformation expression M of the formula (62), the differential vector $(P_{i-1}^* - CP_i^*)$ represents a vector from the action point $P_i^*$ included within the deformation area VCF locally defined on the non-deformed curved surface to each point $P_{i-1}^*$ within the deformation area VCF. This differential vector $(P_{i-1}^* - CP_i^*)$ is multiplied by the vector field function $F_o(P_{i-1}^*, CP_i^*)$. Therefore, the multiplied result indicates that the position $P_{i-1}^*$ is shifted, in parallel to the vector pointing from the action point $CP_i^*$ to the position $P_{i-1}^*$ by the quantity determined by the transformation rate represented by the vector field function $F_o^*, CP_i^*$).

Figure 21:
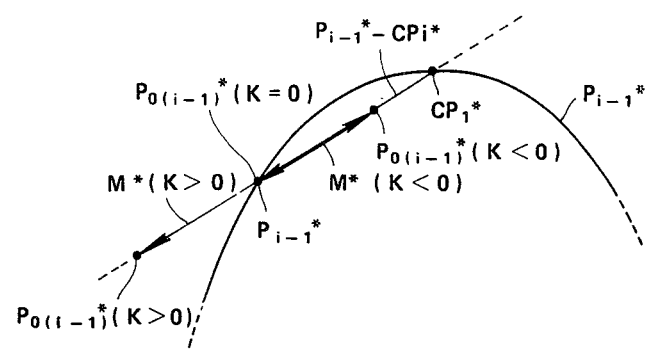
FIGS. 21 and 22 are diagrams for assistance in explaining position transformation functions adopted in forming a curved surface according to the present invention, which are similar to FIGS. 13 and 14.

Therefore, as expressed by the formula (61), the position vector represented by the position transformation function $P_{o(i-1)}^*$ obtained by adding the transformation vector M* to the non-deformed position vector $P_{i-1}^*$ represents, as shown in FIG. 21, a position shifted from the non-deformed position vector $P_{i-1}^*$ in the direction away from the action point $CP_i^*$ when the value of K is positive (K>0), a position shifted from the non-deformed position vector $P_{i-1}^*$ in the direction toward the action point $CP_i^*$ when the value of K is negative (K<0), and a position not shifted from the non-deformed position vector $P_{i-1}^*$ when the value of K is zero (K=0).

Figure 22:
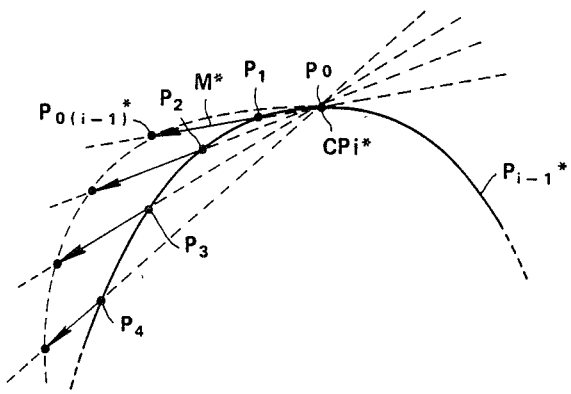

As a result, when the value of K is positive, the position transformation function $P_{o(i-1)}^*$ transforms each point $P_1, P_2, P_3, P_4 \ldots$ on the non-deformed curved surface represented by the position vector $P_{i-1}^*$ to positions away from the action point $CP_i^*$ (that is, diverged positions) by the quantity corresponding to the vector field function $F_o (P_{i-1}^*, CP_i^*)$ on the basis of the transformation vector M* as shown in FIG. 22. When the value of K is negative (K<0), the position transformation function transforms the non-deformed position vector $P_{i-1}^*$ to positions approaching the action point $CP_i^*$ (that is, converged positions). When the value of K is zero (K=0), the position is not transformed.

When a partial position represented by the position vector $P_{i-1}^*$ is designated in a local deformation area VCF on a non-deformed curved surface, the designated position can be retransformed in dependence upon the position transformation function $P_{o(i-1)}^*$ by selecting the vector field function $F_o (P_{i-1}^*, CP_i^*)$ of the transformation vector M* to a desired function according to the kind of the free curved surface required and by determining the value and the sign of the position transformation coefficient K. That is to say, the position retransformed can be controlled by changing the vector field function $F_o^*$, $CP_i^*$) and/or the coefficient K according to necessity.

As a result, even if the same deformation point is designated as when a non-deformed free curved surface is deformed in a local deformation area VCF in accordance with the basic method as described with reference to the formula (1), the surface can be deformed into a different free curved surface according to the selection of the parameters of the transformation vector M*. Therefore, it is possible to realize a curved surface forming apparatus having a great degree of freedom when the operator forms any desired free curved surfaces.

As already described with reference to the formulas (3) and (4), in the case where the deformation point $P_{i-1}^*$ (x, y) designated in a x-y coordinate deformation area VCF is used to obtain the deformation position vector $P_i^*$, a transformation function whose x and y direction position transformation expressions can be expressed as $$x_{o(i-1)} = x + K * (x - X_i) * \text{EXP} \quad (63)$$
$$\left(-\left(\left(\frac{x - X_i}{\alpha_{oi}}\right)^2 + \left(\frac{y - Y_i}{\beta_{oi}}\right)^2\right)\right)$$

$$y_{o(i-1)} = y + K * (y - Y_i) * \text{EXP} \quad (64)$$
$$\left(-\left(\left(\frac{x - X_i}{\alpha_{oi}}\right)^2 + \left(\frac{y - Y_i}{\beta_{oi}}\right)^2\right)\right)$$

is used as the position transformation function $P_{o(i-1)}^*$ ($x_{o(i-1)}, y_{o(i-1)}$) of the formula (61).

This position transformation function describes the Gaussian distribution curve in an elliptic deformation area VCF having a center of the action point $CP_i^*$ ($X_i$, $Y_i$) and x and y direction diameters of $\alpha_{oi}$ and $\beta_{oi}$, as a vector field function $F_o$ of the formula (61).

Further, in this case, the distance from the action point $CP_i^*$ ($X_i$, $Y_i$) to the deformation point $P_{i-1}^*$ (x, y) is obtained by the differential vector $(P_{i-1}^* - CP_i^*)$ of the formula (62).

Therefore, when the value and the sign of the position transformation coefficient K is selected to 0, "+" or "−" in the position transformation functions $x_{o(i-1)}$ and $y_{o(i-1)}$ according to necessity, it is possible to obtain the transformation position information such that the input positions x and y at a deformation point (x, y) can be transformed to a non-changed position, a diverged position, or a converged position, respectively.

When the position transformation method as described above is adopted, it is possible to deform the same deformation point in the deformation area VCF into different curved surfaces according to the way of selecting the parameters. With respect to this point, the transformation function of the x-direction component $x_{o(i-1)}$ of the position transformation function $P_{o(i-1)}^*$ will further be studied.

In this embodiment, the diameters $\alpha_{oi}$ and $\beta_{oi}$ of the position transformation function $P_{o(i-1)}^*$ are selected to the values equal to those $\alpha_{oi}$ and $\beta_{oi}$ of the deformed area VCF.

First, if K=0 in the formula (63), the position transformation function $x_{o(i-1)}$ is $$x_{o(i-1)}^* = x \qquad (65)$$

This implies that the pattern at the deformation point designated on the x-coordinate axis in the deformation area VCF is mapped as it is on the $x_{o(i-1)}$ coordinate axis.

Therefore, when the position transformation coefficient K is zero (K=0), if the deformation point is designated in order to form a free curved surface represented by the position vector $P_i^*$ of the formula (3), the calculation of the formula (3) is directly executed for the designated deformation position. As a result, as shown in FIG. 23, the non-deformed curved surface $P_{i-1}^*$ can be deformed in the deformation area VCF in such a way as to describe the Gaussian distribution curve determined by the vector field function $F_i$ of the formula (5).

Figure 24:
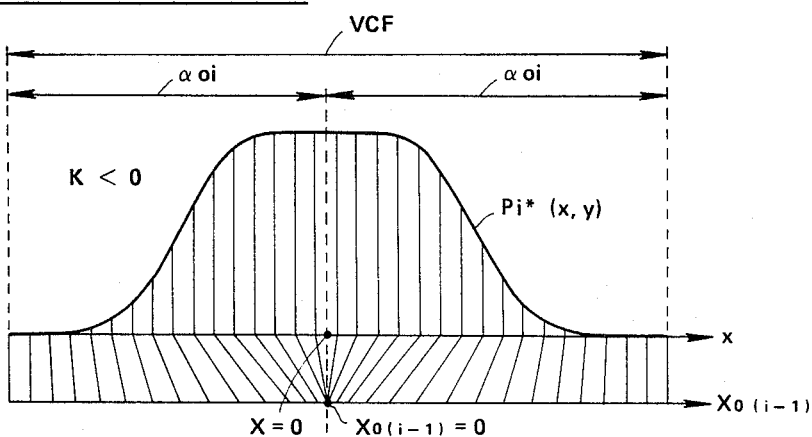

On the other hand, when the position transformation coefficient K is set to have a negative value in the formula (63), the second-term transformation vector $M^*$ of the formula (63) becomes a sign reverse to the first term x, and therefore the value of the position transformation function $x_{o(i-1)}$ is calculated in such a way that the value of x designated as the deformation point is shifted in the direction of convergence to zero, so that as shown in FIG. 24, the pattern of the deformation point designated on the x-coordinate axis is mapped so that the value of $x_{o(i-1)}$ contracts in the direction of the action point.

Figure 23:
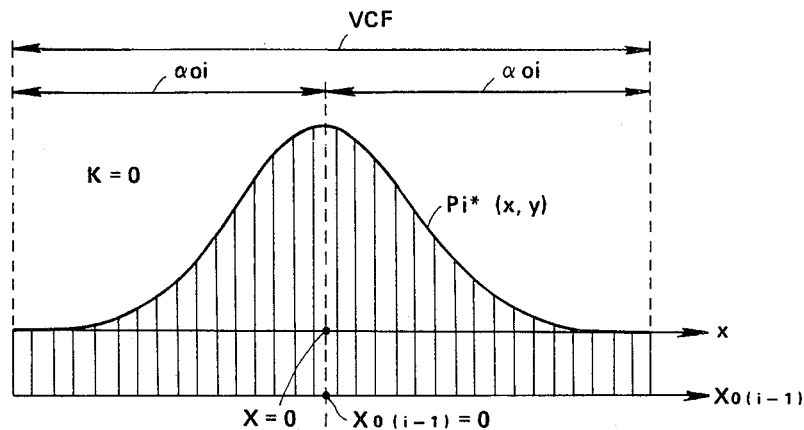
FIGS. 23 to 25 are diagrams showing other examples of characteristic curves adoptable to deformed curved surfaces in the position transforming method according to the present invention, which are similar to FIGS. 15 to 17.

As a result, smaller contracted values are inputted as the position information for the vector field function $F_i$ of the formula (5) as compared with the case shown in FIG. 23. Therefore, even when the same deformation position pattern as in the formula (60) is given on the x-coordinate axis, the deformation position vector $P_i^*$ (x, y) which describes the Gaussian distribution curve as shown in FIG. 23 is not formed, but the deformation position vector $P_i^*$ (x, y) is formed as shown in FIG. 24 in such a way that the Gaussian distribution curve is expanded in the x direction with the action point as its center.

Figure 25:
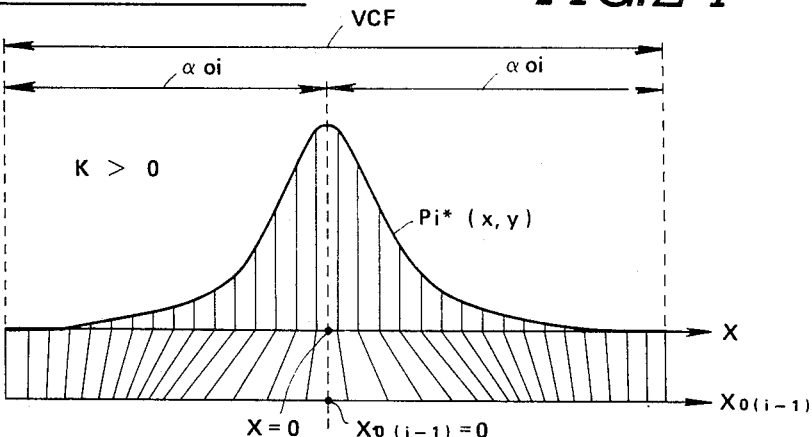

In contrast with this, when the second-term position transformation coefficient K on the right side of the formula (63) is selected to have a positive value, the sign of the second term on the right side thereof matches that of the first term x. Therefore, when the deformation position x is designated, the value of the deformation position function $x_{o(i-1)}$ transformed so as to go away toward the outside from the action point (x=0). As a result, when the position pattern at the deformation point is designated on the x-coordinate axis, the position pattern is mapped onto the $x_{o(i-1)}$-coordinate axis as a pattern which expands toward the outside with the action point (x=0) as its center as shown in FIG. 25.

Therefore, the deformation position vector $P_i^*$ (x, y), obtained when the same position information as in the formula (60) is given as the position information designated and inputted to the vector field function $F_i$ of the formula (5), does not describe the Gaussian distribution curve as in FIG. 23, but describes a deformed curved surface such that the Gaussian distribution curve is contracted in the direction of the action point with the action point (x=0) as its center.

As described above, the position information x of the deformation point on the non-deformed curved surface is once transformed by the position transformation function $x_{o(i-1)}$ in accordance with the formula (63) and then the vector field function $F_i$ of the formula (5) is used as the position information at the deformation point. Therefore, it is possible to freely form various deformed curved surfaces such that the basic deformed curved surface is expanded outward or contracted inward with the action point as its center, even if the same deformation position information is given, by selecting the value of the position transformation coefficient K to zero, a negative value or a positive value, in addition to the basic deformed curved surface obtained in correspondence to the given position information.

Further, the degree of expansion and contraction can freely be determined by changing the value of the position transformation coefficient K according to necessity. Therefore, it is possible to form any deformed free curved surfaces of various shapes ranging from the one having a relatively sharp top end to the one having a truncated shape.

In the above description, only the position transforming function of the x direction component $x_{o(i-1)}$ expressed by the formula (63) has been explained in the position transformation function $P_{o(i-1)}^*$. However, with respect to the y direction component $y_{o(i-1)}$ expressed by the formula (64), it is possible to obtain various deformed curved surfaces in the y-axis direction by selecting the value of the position transformation coefficient K at the operator's option in quite the same way as in the x direction component.

That is to say, it is possible to form various deformed curved surfaces within the two-dimensional deformation area VCF of x-y coordinates on the non-deformed curved surface.

Figure 26:
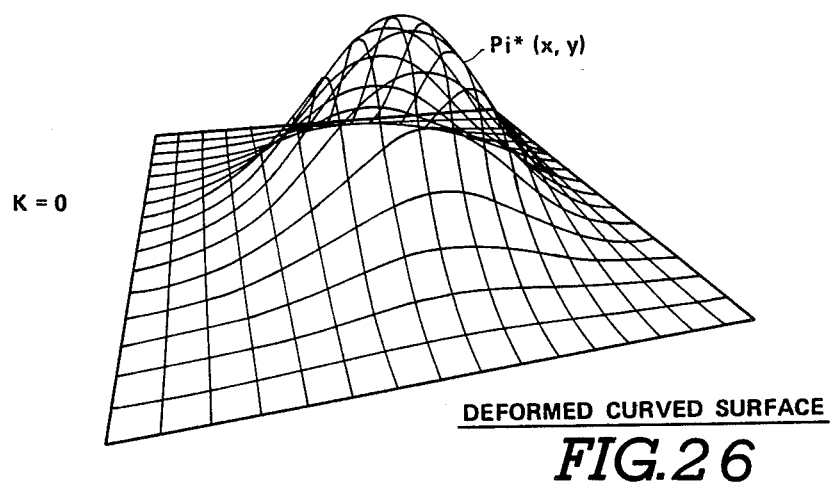
FIGS. 26 to 28 are perspective views showing some examples of curved surfaces formed by the method according to the present invention, in wire frame fashion, which are similar to FIGS. 18 to 20.
Figure 27:
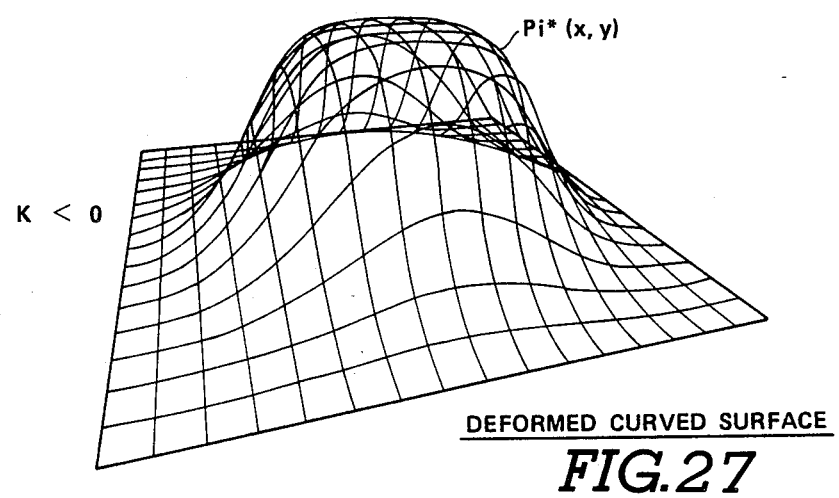
Figure 28:
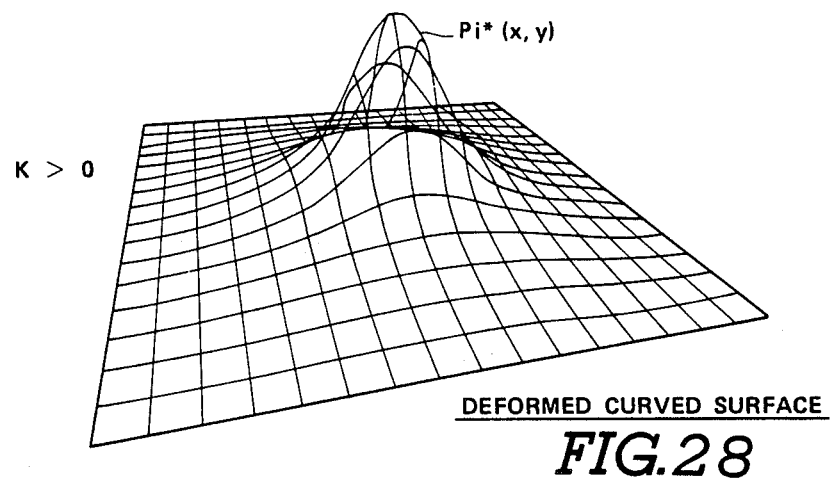

Further, according to experiments, it has been confirmed that it is possible to form the deformed curved surfaces $P_i^*$ (x, y) as shown in FIGS. 26, 27 and 28 by locally deforming a non-deformed curved surface on the basis of the embodiment constructed as described above.

FIG. 26 shows the deformed curved surface obtained when the position transformation coefficient K is set to zero (K=0) in the formulas (63) and (64), and the deformation position vector $P_i^*$ (x, y) has the Gaussian distribution curved surface.

FIG. 27 shows the case where a negative value is set as the position transformation coefficient K, and the position vector $P_i^*$ (x, y) representative of the deformed curved surface has a curved surface such that the top end is pushed down with the action point (x=0, y=0) as its center as compared with the basic deformed curved surface shown in FIG. 26.

Further, FIG. 28 shows the case where a positive value is set as the position transformation coefficient K, and the deformation position vector $P_i^*$ (x, y) has a curved surface having a greater sharpness near the action point (x=0, y=0) as compared with the basic curved surface shown in FIG. 26.

The apparatus for displaying various stereographic images on a display screen in accordance with the method according to the present invention in which various images are mapped on a free curved surface will be described in detail hereinbelow.

As the first application example, a dress design forming apparatus for designing a figure such as a pattern or a design on a paper dress pattern will be described with reference to the attached drawings.

Figure 29:
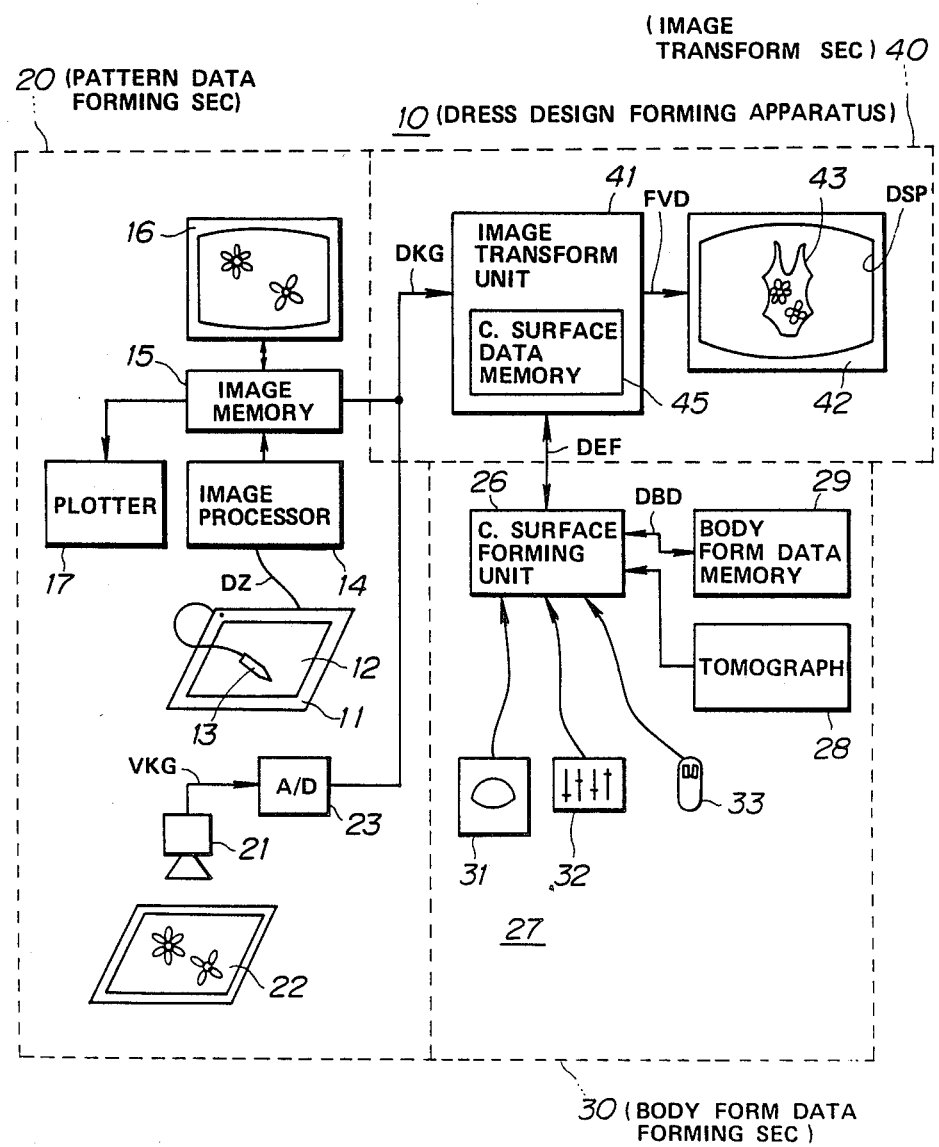
FIG. 29 is a schematic block diagram showing an embodiment of the dress design forming apparatus to which the method according to the present invention is applied.

In FIG. 29, the reference numeral 10 denotes the whole dress design forming apparatus made up of a paper dress pattern data forming section 20, a body form data forming section 30, and an image transforming section 40.

The paper dress pattern forming section 20 generates paper pattern data DKG obtained when a figure or pattern is designed on a flat paper pattern. The figure or pattern designed on a paper pattern 12 by a designer is read by a figure input device 11 by use of a mouse 13, for example, to input the figure data DZ to an image processor 14 composed of a computer.

The image processor 14 reads the figure data DZ given through the figure input device 11 and stores the data in an image memory 15 after performing any necessary data processing. The figure data DZ stored in the image memory 15 are read, where necessary, under the control of the image processor 14 and are then displayed on a paper pattern display unit 16 of a cathode ray tube (CRT), for instance. In this embodiment, the data of the image memory 15 can also be plotted on a figure surface by a plotter 17.

When the designer wants to modify the figure or pattern, the designer can modify the paper pattern data by modifying the paper pattern 12 attached to the figure input device 11 by inputting again the data through the mouse 13, while watching the figure displayed on the paper pattern display unit 16 or obtained through the plotter 17.

By doing this work, the designer can store the paper pattern data DKG representative of figures or patterns designed on a flat dress paper pattern in the image memory 15 and, where necessary, supply the data to the image transforming section 40.

In this embodiment, the paper pattern forming section 20 further includes a television camera 21 which takes a picture of the paper pattern 22, to transduce the figure or pattern on the paper pattern 22 into video signals. The signals are converted into the paper pattern data DKG through an analog to digital converter 23, and the corresponding digital data are applied to the image transforming section 40.

The body form data forming section 30 generates stereographic data representative of a body form of a person who will put on a tailored dress. The section 30 includes a curved surface forming unit 26 which forms a body form curved surface BD (see FIG. 30) representative of the unevenness of the surfaces of a human body on the basis of data inputted through a parameter input means 27 or a tomograph 28, and stores the three-dimensional body form data DBD representative of the body form curved surface BD in a body form data memory 29.

The parameter input means 27 to the unit 26 is made up of a trackball 31, a plurality of levers 32 and a mouse 33. A visual point from which a shape (i.e., the body form) can be seen after deformation is decided by the trackball 31. A deformation area VCF representative of a range within which a deformation is made and parameters as to a deformation vector $V_i^*$ representative of the direction of deformation and the quantity of deformation are inputted by the levers 32. An action point $CP_i^*$ representative of a position at which a deformation is made can be designated by the mouse 33. The action point $CP_i^*$ is displayed by a cursor on a display screen DSP of a display unit 42.

In addition to the above system configuration, in this embodiment, information as to the external surface of a body formed by the tomograph 28 is given to the curved surface forming unit 26 and is then stored in the body form memory 29 as the body form data DBD.

Figure 30:
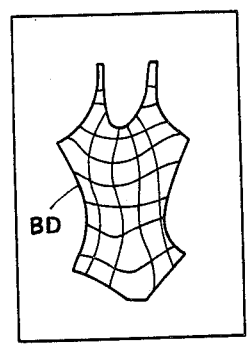
FIG. 30 is a diagram showing a body form data surface stored in a body form data memory of the dress design forming apparatus shown in FIG. 29.

Therefore, the body form data DBD stored in the body form data memory 29 represent the surface of a body or a body line as shown in FIG. 30 as a model in wire frame picture fashion. Further, in this embodiment, a swimming suit is designed as a dress.

The body form data DBD stored in the body form data memory 29 are outputted to an image transforming unit 41 of the image transformation section 40 through a curved surface forming unit 26 included in the unit 41. The unit 41 includes a programmed CPU. The image transforming unit 41 transformation calculates the flat paper pattern data DKG supplied from the paper pattern data forming unit 20 on the basis of the deformation control data DEF representative of a stereographic curved surface, that is, transforms the data DKG into the image (video) data FVD the same as when the flat figure or pattern represented by the paper pattern data DKG are stuck onto a body form data curved surface BD (as shown in FIG. 30) represented by the deformation control data DEF (referred to as mapping). The transformed image data FVD are given to the display device 42 of a CRT, for instance, in order to display a stereographic dress and ornament image 43 on the display screen DSP.

A unit as disclosed in Japanese Unexamined Published Patent Application No. 58-19975 is applicable to this image transforming unit 41. The paper pattern image data DKG is mapped on the body form curved surface BD represented by the deformation control data DEF in accordance with the following procedure.

Figure 31:
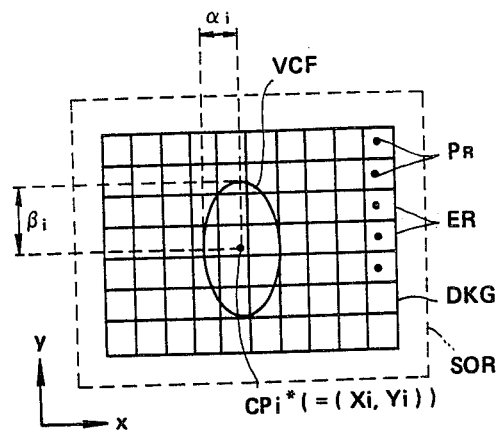
FIG. 31 is a diagram for assistance in explaining a source surface processed by a curved surface forming unit of the dress design forming apparatus shown in FIG. 29.

That is to say, the original surface SOR of x-y coordinates on which the paper pattern image data DKG are represented is divided into as many small areas ER as are needed, and a deformation calculation is executed on the basis of the deformation control data DEF at a representative point $P_R$ within each divided area ER to transform the coordinates onto the body form curved surface BD (refer to FIG. 31).

Therefore, a transformed image based on representative points $P_R$ is formed on the body form curved surface BD. Then the image transforming unit 41 forms a parallelogram area (which has four sides along the direction so that adjacent representative points are mutually connected) having a predetermined size including the central representative point $P_R$ on the basis of the four surrounding representative points $P_R$. The unit 41 next executes interpolation calculation for each image element position included in this parallelogram area. The interpolation calculation determines the image element position within the parallelogram area obtained after deformation on the basis of the corresponding divided area ER on the original source surface SOR and the positional relationship of image elements included therewithin.

When each image element position is determined within the parallelogram area on the body form curved surface BD, the image transforming unit 41 allocates the image information which each corresponding image element has on the original source surface SOR, to each image element on the body form curved surface BD. As a result, a pattern or a figure described on the original surface SOR is image-transformed on the basis of the image control data DEF, so that a stereographic display image mapped on the body form curved surface BD is displayed on the display screen DSP of the display unit 42.

As described above, since the paper pattern image data DKG on the original source surface SOR representative of the paper pattern figure are image-transformed at each representative point $P_R$ and further the interpolation calculations are made on the basis of the representative points $P_R$ obtained after transformation to transform the paper pattern image into the transformed image, the image transforming unit 41 practically performs the transforming processing at real time.

After the deformation control data DEF corresponding to one body form to which a designer wants to design have been set by the parameter input means 27, when the contents of the paper pattern data DKG outputted from the paper pattern data forming section 20 are repeatedly rewritten by the designer through the figure input device 11, the image transforming unit 41 executes at real time the calculations for mapping the rewritten data on the body form curved surface BD, so that the obtained deformed image can be displayed on the display unit 42.

In the above system configuration, the designer first stores the body form data DBD representative of a person's body form which wears the dress in the body form data memory 29 of the body form data forming section 30.

As the first method therefor, the paper pattern data DKG represented on a plane is stored in the curved surface data memory 45 of the image transformation unit 41 by the use of a television camera 21, for instance. By the use of the data in the curved surface data memory 45 and by inputting parameters through the parameter input means 27, the body form curved surface BD can be formed.

Here, whenever parameter data are inputted through the parameter input means 27, the curved surface data of the curved surface data memory 45 are deformed on the basis of he deformation control data DEF outputted from the curved surface forming unit 26 and then displayed on the display unit 42. Therefore, the designer can form the body form curved surface BD representative of a person's body form to which a dress is put by deforming it little by little while watching the displayed dress image 43 in an interactive fashion to the image processor (computer) 14.

In a second method, photographs of a person's body form to which a dress is put are taken by a tomogram; the resultant body form data DBD are signal processed by the curved surface forming unit 26 where necessary and stored in the body form memory 29; the stored data are outputted from the curved surface forming unit 26 as deformation control data DEF in order to deform the body form according to a person to which a dress is put.

As described above, after the body form data DBD representative of the body form curved surface BD for a person to which a dress is put have been stored in the body form data memory 29, the designer inputs the paper pattern data DKG representative of a plan figure or pattern described on a paper pattern 12 or 22 into the picture transforming unit 41 by the use of the figure input device 41 of the paper pattern data forming section 20 or a television camera 21. At this moment, the image transforming unit 41 maps the figure described on the paper pattern 12 or 22 onto the body form curved surface BD for image transformation processing, and then displays the image data FVD on the display screen DSP of the display unit 42.

As described above, since partial areas can be deformed so as to be expandable or contractible according to a person's body form or the portions of a body to which a dress is put, when a dress is tailored on the basis of a paper pattern having a now designed figure, it is possible to represent the deformation caused when the ordered person puts on the tailored dress.

Therefore, when the designer designs a figure or a pattern on a paper pattern 12 or 22, it is possible to display a dress image 43 the same as when a person puts a dress formed on the paper pattern by the display unit 42, without putting the dress on the ordered person as the first fitting or basting. Thus, it is possible to simplify the labor required for dress design work.

Further, when the paper pattern data forming section 20 is used in designing a figure or a pattern on a paper pattern, in particular, since it is possible to perform the forming work of paper pattern data DKG by deforming the data little by little to a desired design while watching the dress image displayed on the display unit 42, the designer can modify the design on the paper pattern into an optimum condition under consideration of various conditions such as customer's body form, customer's preference, etc.

That is, in the state where no data are stored in the image memory 15, for instance, the paper pattern data DKG is blank. At this moment, the dress image 43 is displayed in such a way as to stereographically represent a body form determined by the body form data memory 29.

In this state, when the designer begins to describe a design such as a pattern or a figure on a paper pattern 12 by the use of the mouse 13, since the figure or the pattern is displayed on the display screen DSP of the display unit 42 in real time fashion, the designer can decide an addition of the figure or can modify a part of the figure in interactive fashion to the apparatus while watching the figure or the pattern stereographically displayed as the dress image 43 and further judging the figure.

Therefore, even in the case where some pattern or figure is designed for an expandable dress material such as for a swimming suit, for instance, the designer can confirm the deformation of the figure on the paper pattern caused when the dress is put on a person in real time fashion, so that it is possible to form a paper pattern on which an optimum design can be made for a customer.

In the case where a dress such as a skirt having a pleat (plait) is put on the customer, the opening rate of the pleat changes according to the body form of the customer However, since the deformed dress image 43 can be displayed on the display unit 42, the designer can confirm the deformation of the figure according to the body form of the customer, so that it is possible to design an appropriate figure for the address as described above.

It is also possible to design a pattern or a figure which can improve the body proportion of the customer on the basis of the dress image 43.

In the above description, the embodiment has been explained in the case where a dress using an expandable dress material such as a swimming suit is designed. However, without being limited thereto, the present embodiment is applicable to the design of when a non-expandable dress material is used. In this case, the plane figure on a paper pattern formed by the paper pattern data forming section 20 can be displayed on the display unit 42 of the image transforming section 40 as a stereographically deformed dress image 43 obtained when the customer puts on the dress. Therefore, it is possible to obtain the similar effect.

In the above-embodiments, although the case has been explained where data directly representative of a person's body form are used as the body form data. Without being limited to this, in summary, the data representative of the surface conditions of a dress expected when a dress to be tailored is put on the customer should be used.

As the second application example, a physiognomic image forming apparatus for forming a facial look such as a montage picture will be described with reference to the attached drawings.

Figure 32:
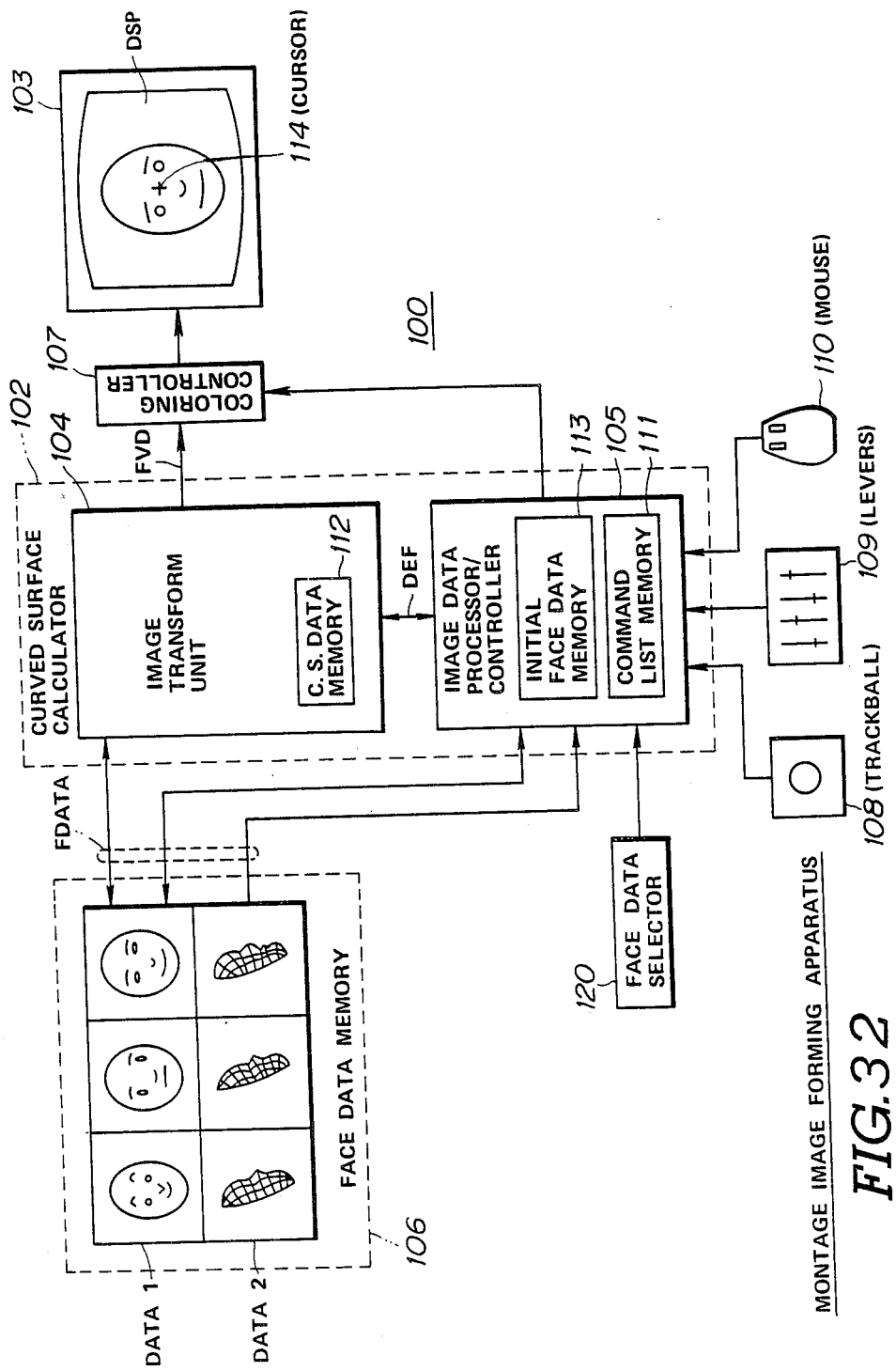
FIG. 32 is a schematic block diagram showing an embodiment of the montage image forming apparatus to which the method according to the present invention is adopted.

In FIG. 32, the reference numeral 100 denotes a physiognomic image forming apparatus. A physiognomic image data FVD obtained at the output terminal of the curved surface calculator 102 is displayed on the display unit 103 of a cathode ray tube (CRT).

The curved surface calculator 102 comprises an image transforming unit 104 and an image data processing controller 105 for controlling the unit 104. The curved surface calculator 102 executes such an image transforming processing that a front facial image data DATA 1 included in the facial data FDATA is mapped onto a stereographic curved surface formed by the image data processing controller 105 on the basis of the facial data FDATA supplied from the facial data memory 106 in order to form a physiognomic image data FVD. This physiognomic image data FVD is inputted to the display unit 103 through a coloring controller 107, so that a stereographic physiognomic image obliquely seen from a predetermined visual point can be displayed on a two-dimensional plan display screen DSP of a display unit 103.

To the image data processing controller 105, parameter input means of a trackball 108, plural levers 109 and a mouse 110 are connected. The functions of the parameter input means are the same as shown in FIGS. 4 and 29, so that the description thereof is omitted herein.

The facial data memory 106 stores a plurality of facial data used as the basis of the physiognomic image to be formed. The human faces are classified in accordance with predetermined standards according to necessity, for instance, such as generation (children, youth, the aged), sex distinction, face shapes (long, round, square, triangular), and human faces having standard features are collected as sample data.

Each of facial data FDATA has a front two-dimensional facial image data DATA 1 obtained when seen from the front. In addition, each of facial data FDATA has a facial stereographic data DATA 2 representative of facial unevenness at each point of the facial surfaces represented by various kinds of front facial image data.

In practice, the front facial image data DATA 1 are stored as digital data representative of image element luminances obtained by taking a picture of a human front face with a television camera and by allocating the image on an (x, y) plane in lattice form. Further, the stereographic face data DATA 2 are stored as digital data representative of heights in the z direction on surface parts of a face for each image element allocated on the (x, y) plane.

The image transforming unit 104 receives an appropriate front facial image data DATA 1 selected from the facial data memory unit 106 by means of a face data selector 120 and maps the front facial image represented by the front facial image data DATA 1 on the original source surface SOR represented by the (x, y) coordinates, on the basis of the deformation control data DEF supplied from the image data processing controller 105, in order to display the front facial image on the display unit 103 (as it is when the deformation control data DEF designates no deformation).

The image data processing controller 105 designates a position vector representative of an action point $CP_i^*$ on the $(X_i, Y_i)$ coordinates of the original source surface SOR on the basis of the parameters inputted through the parameter input means and executes a deformation calculation only within a deformation area VCF including the action point $CP_i^*$.

Further, the color of the physiognomic image displayed on the display unit 103 can be modified or controlled to a desired color by the coloring controller 107.

Therefore, in the physiognomic image forming apparatus 100 configured as shown in FIG. 32, when the operator forms a physiognomic image, one of the standard face data stored in the face data memory 106 is selected and displayed on the display unit 103 on the basis of investigation information such as a firsthand account of a witness. A part of the displayed physiognomic image is then designated by the cursor 114 and an area required to deform is designated within the deformation area VCF. A face image resembling as much as possible an observed human face can then be formed in interactive fashion using the apparatus.

Figure 33:
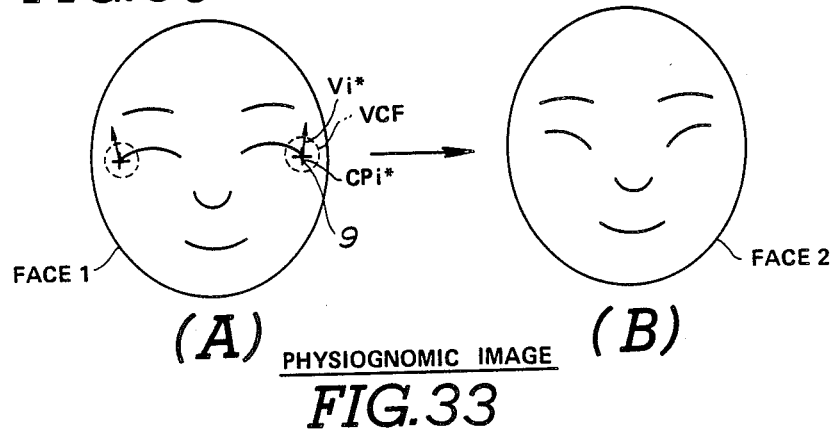
FIGS. 33A and B, and 34A-C are digrams showing examples of the deformation operation in forming montage images.

In the case where there exists a particular feature, for example a point at which the corner of the eye is slanted, the cursor 114 is positioned at the corner of the eye of the face image FACE 1 before deformation, as shown in FIG. 33(A), to set an action point $CP_i^*$. An area within which the deformation is required is set near the corner of the eye as a deformation area VCF. A deformation vector $V_i^*$ is then set in the direction that the eye is slanted upwards.

Then, the curved surface calculator 102 transformation-calculates the physiognomic image FACE 1 now displayed on the display unit 103 into another image in which the corner of the eye and its surrounding are slanted upward as shown in FIG. 33(B) in accordance with the parameters. When the above-mentioned deformation operation is made in sequence for both the corners of the eyes, it is possible to change a physiognomic image FACE 2 obtained by deformation step by step to another physiognomic image which agrees with the investigation information.

Therefore, being different from the conventional montage photograph method, since a face obtained by the data stored in the face data memory 106 is deformed, it is possible to obtain a neutral physiognomic image without losing the fundamental features and the information as to the complexion of each kind of face.

Figure 34:
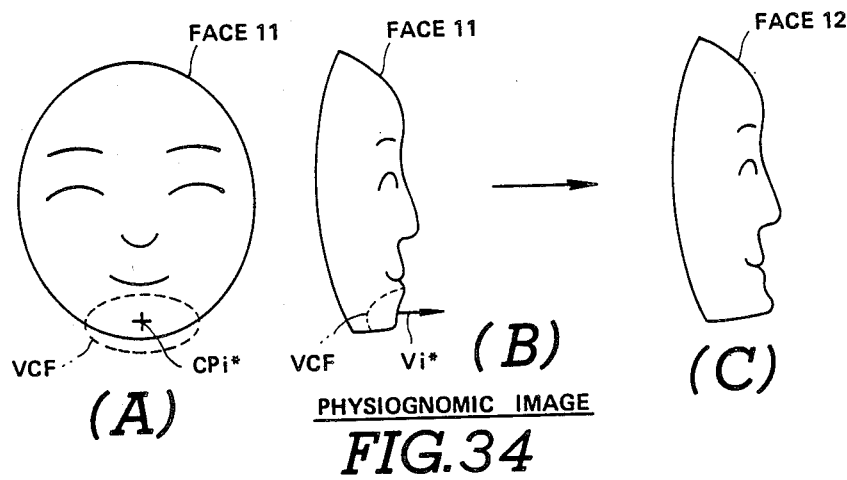

In addition, in the system configuration shown in FIG. 32, it is possible to readily execute the deformation processing not only for a front physiognomic image but also the profile thereof. For instance, as shown in FIG. 34, in the case where a physiognomic image of a person with a prominent chin is required, the action point $CP_i^*$ is set to the chin; an elliptic deformation area VCF is set, and a deformation vector $V_i^*$ directing toward the front as shown in FIG. 34(B) is set at the action point $CP_i^*$ in a front face image as shown in FIG. 34(A). By doing this, it is possible to readily form a physiognomic image of a person with a prominent chin, as shown by FIG. 34(C), by partially modifying the chin of the physiognomic image FACE 11 prior to deformation.

Further, since the physiognomic image on the display unit 103 can be rotated by shifting the visual point with respect to the deformed physiognomic image, it is possible to readily confirm whether the physiognomic image formed by the operator agrees with the investigation information obtained by the witness from various points of view.

As a third application example, a decision information displaying apparatus which allows a device, such as a computer provided with a decision capability, to visually transmit decision results to the operator in the form of various human facial expressions will be described with reference to the attached drawings.

Figure 35:
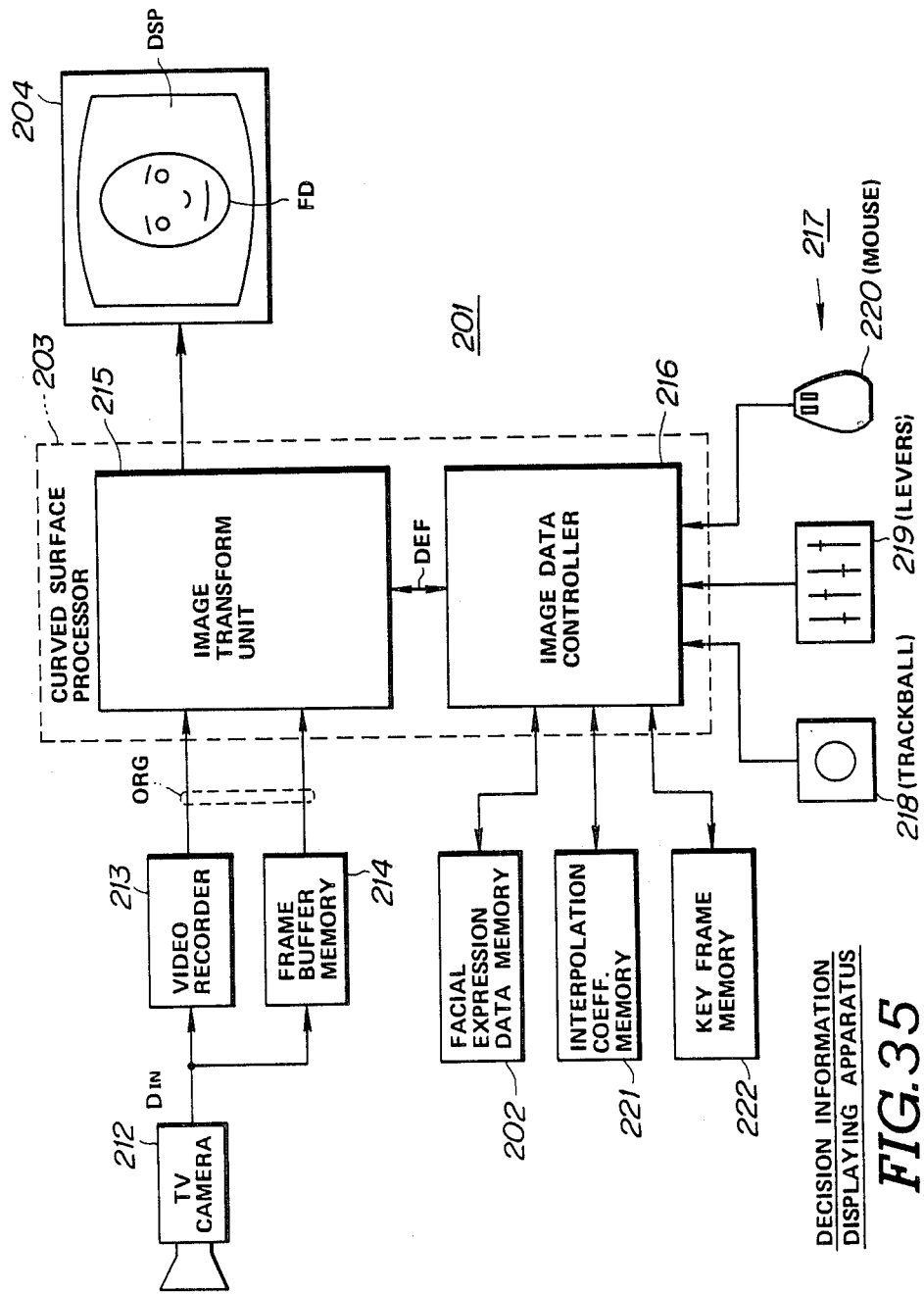
FIG. 35 is a schematic block diagram showing an embodiment of the decision information displaying apparatus to which the method according to the present invention is applied.
Figure 36:
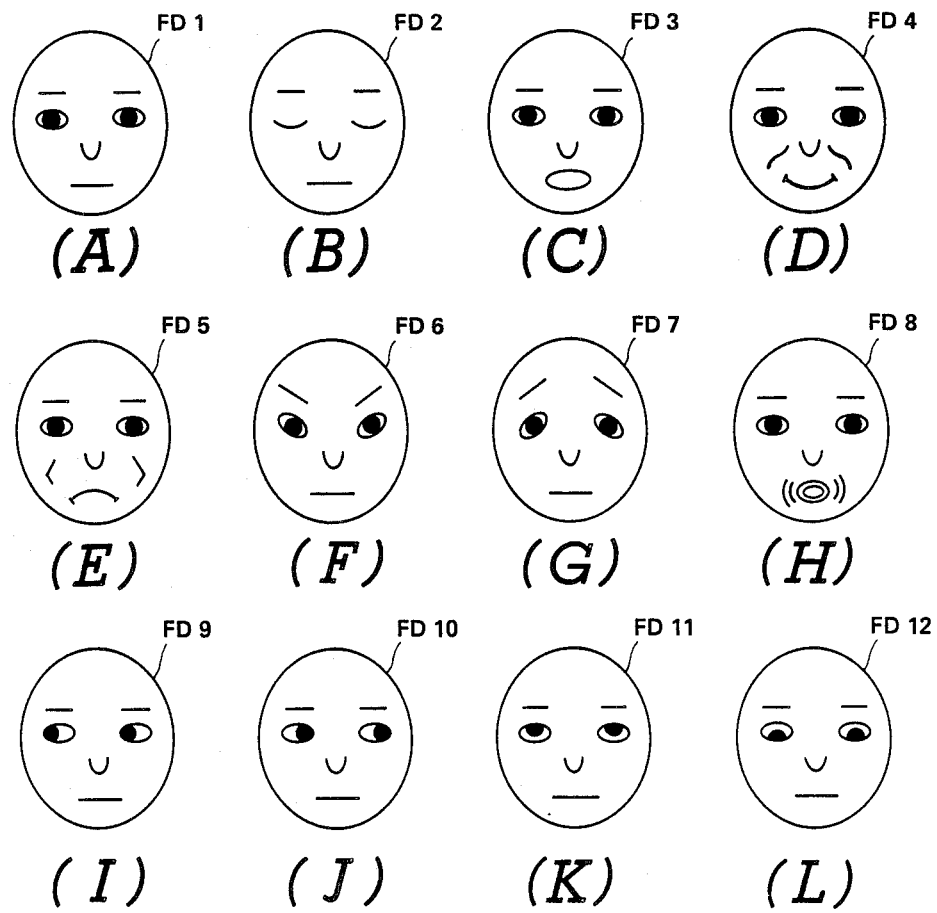
FIGS. 36A-H is a series of human face diagrams for assistance in explaining various primitive facial expression curved surface data.

In FIG. 35, the reference numeral 201 denotes a decision information displaying apparatus. The apparatus 201 includes a facial expression curved data memory 202 for storing various curved surface data (referred to as facial expression curved surface data) representative of various facial expressions. In this memory 202, various primitive facial expression curved surface data FD1, FD2, ... FD12 representative of various standard facial expressions as shown in FIG. 36 are stored. These facial expression curved surface data FD1, FD2, ... FD12 are provided with such facial expressions as to be selected on the basis of the decision information $R_{IN}$ representative of the decision results of the computer.

For instance, in the case where a management result is required to be displayed by a computer, if the business result is remarkably good, the facial expression curved surface data FD6 representative of "cheerful, joyous look" as shown in FIG. 36(C) is selected. If a decision result such that a beginning of an improvement is represented is obtained, the facial expression curved surface data FD6 representative of "smart, determined look" as shown in FIG. 36(F) is selected according to the result. In contrast with this, if the decision result such that the business result is hard to increase is obtained, the facial expression curved surface data FD7 representative of "worried look" as shown in FIG. 36(G) is selected. If the business inactivity further increases, the facial expression curved surface data FD5 representative of "gloomy look" as shown in FIG. 35(E) is selected.

These facial expression curved surface data are read from the facial expression data memory 202 by the curved surface processor 203 on the basis of the decision information $R_{IN}$ given to the curved surface processor 203 from the computer and then displayed on the display unit 4. Therefore, the operator can immediately grasp the contents of the decision information $R_{IN}$ coming from the computer in dependence upon the facial expression of the face image displayed on the display screen DSP of the display unit 204.

In the decision information displaying apparatus 201 shown in FIG. 35, various facial expression curved surface data corresponding to various primitive face images which can display delicate changes in facial expression on the display unit 204 are stored in the facial expression curved surface data memory 202.

In more detail, the photograph of a face image represented on a plane original surface is taken by a TV camera 212, and the original image data $D_{IN}$ obtained at the output terminal of the TV camera 212 are recorded in a video recorder 213 such as a video tape recorder, a video sheet recorder, etc. or stored in a frame buffer memory 214.

Therefore, the facial expression image data ORG obtained at the output terminal of the video recorder 213 or the frame buffer memory 214 represent facial expression images on a two-dimensional plane. The facial expression image data ORG are deformation-processed by an image transformation unit 215 on the basis of the deformation control data DEF supplied from an image data controller 216, and the display data $D_{OUT}$ obtained by mapping the facial expression image data ORG on the facial expression curved surface data can be outputted to the display unit 204.

In the case of this embodiment, the primitive facial expression curved surface data FD1, FD2, ... FD12 shown in FIG. 36 are formed according to the parameters inputted by the image data controller 216 through the parameter input means 217 in accordance with the method as described later. The image transformation unit 215 is so controlled on the basis of the deformation control data DEF representative of the deformed curved surface thus formed as described above as to execute such mapping calculations that the facial expression image data ORG can be mapped on a stereographic curved surface.

Further, the parameter input means 217 is made up of a trackball 218, plural levers 219 and a mouse 220.

The image transformation unit 215 receives the facial expression image data ORG and displays the facial expression image represented by the facial expression image data ORG on the basis of the deformation control data DEF supplied from the image data controller 216. When this deformation control data DEF does not indicate a deformation, in the same way as in the first and second application examples, the unit 215 displays the facial expression image on the display unit 204 by mapping the facial expression image as it is onto the source surface SOR represented by x-y coordinates.

When the operator has completed all the deformation processings, the image data controller 216 obtains an affirmation (YES) result in step SP11 (refer to FIG. 5), and stores deformed curved surface data formed by N-time deformation processings in the facial expression curved surface data memory 202 as one primitive facial expression curved surface data FD1, proceeding to the step SP12 to complete the program.

In the same way, when the other primitive facial expression curved surface data FD2, FD3, ... FD12 are formed, the image data controller 216 repeats the procedure of the above-mentioned curved surface deformation processing on all such occasions. In the procedure of curved surface deformation processing, when the operator selects the parameters inputted through the parameter input means 217 according to the necessity, it is possible to store a plurality of primitive face image data such as "an angry look", "a sad look", "a worried look", "a sunny look", etc. in the facial expression curved surface data memory 202.

Figure 37:
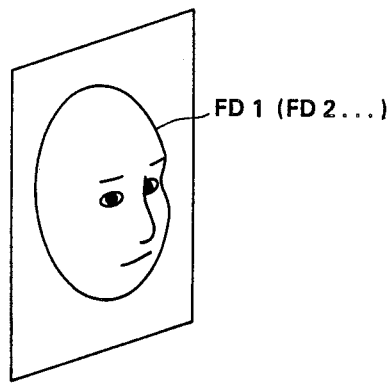
FIG. 37 is a perspective view showing a three-dimensional face image displayed on a display unit of the decision information displaying apparatus shown in FIG. 35.

Therefore, when a decision information $R_{IN}$ is given from a computer having a decision capability, the decision information displaying apparatus 201 reads the facial expression curved surface data corresponding to this given decision information $R_{IN}$ from the facial expression curved surface data memory 202 and displays it on the display unit 204 through the image transformation unit 215, so that it is possible to display the contents of the decision information $R_{IN}$ on the basis of the facial expression represented by the facial expression curved surface data. Thus, as shown in FIG. 37, it is possible to display a face image obtained by mapping the facial expression image data ORG onto the stereographic curved surface formed by the facial expression curved surface data FD1, FD2, ... FD12.

Therefore, the operator can readily grasp the contents of the decision information $R_{IN}$ in the dependence upon the sense of sight when watching the facial expression of the face image displayed on the display unit 204.

Further, the primitive facial expression curved surfaces stored in the facial expression curved surface data memory 202 can be displayed on the display unit 204 as face images having further diversified facial expressions on the basis of the interpolation calculation processing as described below.

For instance, when two facial expression curved surface data are selected from the facial expression curved surface data FD1, FD2, ... FD12 (the selected data are denoted as $FD_A$ and $FD_B$) and these two curved surface data $FD_A$ and $FD_B$ are interpolated on the basis of an interpolation coefficient K, the obtained facial expression curved surface data $FD_{AB}$ can be obtained by executing the following interpolation calculation:

$$FD_{AB}=(1-k)\, FD_A+kFD_B \qquad (66)$$

where k is selected as $$0 \leq k \leq 1 \qquad (67)$$

The facial expression curved surface data $FD_{AB}$ obtained in accordance with the interpolation calculation of the formula (66) has a facial expression lying between the two facial expression curved surface data $FD_A$ and $FD_B$, being different from each of them. Therefore, even if there exists a limitation of the number of the primitive facial expression curved surface data stored in the facial expression curved surface data memory 202, it is possible, in practice, to form and display facial expression curved surface data having intermediate facial expressions.

The interpolation coefficient k is stored in an interpolation coefficient memory 221. When a facial expression curved surface data which requires an interpolation is designated by the decision information $R_{IN}$, the image data controller 216 reads two facial expression curved surface data $FD_A$ and $FD_B$ from the facial expression curved surface data memory 202 and further reads an interpolation coefficient from the interpolation coefficient memory 221, and then displays the data on the display unit 204 through the image transformation unit 215.

Owing to this method, it is possible to display face images having diversified facial expressions on the display unit 204 without increasing the number of the primitive facial expression curved surface data to be stored in the facial expression curved surface data memory 202.

Further, in the above interpolation, the interpolation calculation is made between two facial expression curved surface data. However, without being limited to the two data, in the case where plural facial expression curved surface data such as, for instance, four data $FD_A$, $FD_B$, $FD_C$ and $FD_D$ are interpolation-calculated in sequence on the basis of three interpolation coefficients $k_1$, $k_2$ and $k_3$ (referred to as multiplex interpolation), it is possible to obtain face images having intermediate facial expressions between these four facial expression curved surface data $FD_A$ to $FD_D$. In this case, it is possible to obtain the same effect as in the case of the interpolation between two data.

In this embodiment, the facial expression curved surface data $FD_{AB}$ obtained by interpolating the two facial expression curved surface data $FD_A$ and $FD_B$ on the basis of an interpolation coefficient $k_1$ can be expressed as $$FD_{AB}=(1-k_1)\, FD_A+k_1 FD_B \qquad (68)$$

The facial expression curved surface data $FD_{ABC}$ obtained by interpolating the facial expression curved surface data $FD_{AB}$ and $FD_C$ on the basis of an interpolation coefficient $k_2$ can be expressed as $$FD_{ABC}=(1-k_2)\, FD_{AB}+k_2 FD_C \qquad (69)$$

The facial expression curved surface data $FD_{ABCD}$ obtained by interpolating the facial expression curved surface data $FD_{ABC}$ and $FD_D$ on the basis of an interpolation coefficient $k_3$ can be expressed as $$FD_{ABCD}=(1-k_3)\, FD_{ABC}+k_3 FD_D \qquad (70)$$

Therefore, the finally-obtained facial expression curved surface data $FD_{ABCD}$ can be obtained by adding the products of multiplex interpolation coefficients $I_A$, $I_B$, $I_C$ and $I_D$ and the facial expression curved surface data $FD_A$, $FD_B$, $FD_C$, and $FD_D$ as expressed below:

$$FD_{ABCD} = I_A \cdot FD_A + I_B \cdot FD_B + I_C \cdot FD_C + I_D \cdot FD_D \qquad (71)$$

where the interpolation coefficients $I_A$, $I_B$, $I_C$ and $I_D$ are stored in the interpolation coefficient memory 221 as a series of related interpolation coefficients and expressed as follows:

$$I_A = (1 - k_3)(1 - k_2)(1 - k_1) \qquad (72)$$

$$I_B = (1 - k_3)(1 - k_2)k_1 \qquad (72)$$

$$I_C = (1 - k_3)k_2 \qquad (72)$$

$$I_D = k_3 \qquad (72)$$

In the above embodiment, only one facial expression curved surface data is allocated in response to one decision information $R_{IN}$. In place of this embodiment, however, it is also possible to display a plurality of facial expression curved surface data in such a way that the data vary as the time elapses when a decision information $R_{IN}$ comes (referred to as animation display mode).

In order to permit the above-mentioned animation display mode, the image data controller 216 is provided with a key frame memory 222. This key frame memory 222 allows a plurality of facial expression curved surface data for instance, such as three data FD2, FD1 and FD3 to be displayed in sequence as time elapses as shown at time points $t_1$, $t_2$, and $t_3$ in FIG. 38. Further, the facial expression curved surface data FD2 and FD1 are interpolated between the time points $t_1$ and $t_2$ and the interpolation coefficient value is changed from 0 to 1. In the same way, the facial expression curved surface data FD1 and FD3 are interpolated and the interpolation coefficient is changed from 0 to 1.

Here, the facial expression curved surface data FD2, FD1 and FD3 to be displayed at time points $t_1$, $t_2$ and $t_3$ are referred to as key frames, and data representative of the arrangement of these key frames and the time points to be displayed are stored in the key frame memory 222. In addition, the changes in the interpolation coefficients between the time points $t_1$ and $t_2$ and between the time points $t_2$ and $t_3$ are stored in the key frame memory 222 as digital data allocated at predetermined time intervals.

Figure 38:
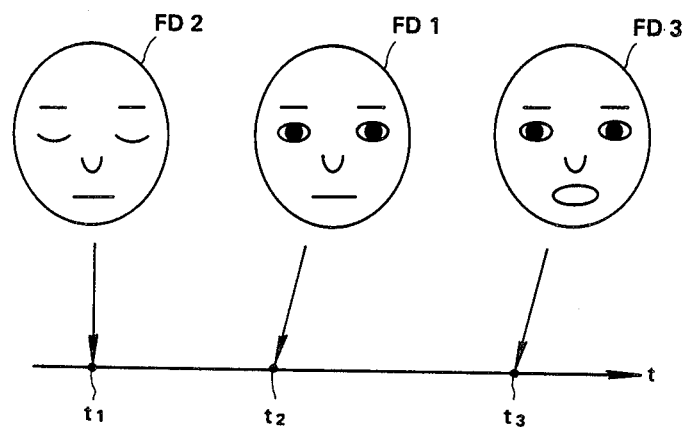
FIG. 38 is a diagram showing an arrangement of key frames in animation display mode.

Therefore, when an animation mode in which the facial expression changes as shown in FIG. 38 is designated to the image data controller 216, the image data controller 216 reads from the key frame memory 222 various data related to the key frame arrangement, the display time points, and the change in the interpolation coefficient to the time elapsed and forms deformation control data DEF on the basis of the interpolation coefficient which changes according to the time elapsed. Therefore, face images as shown in FIG. 38 can be displayed on the display unit 204 in the animation mode.

As described above, the face image displayed on the display unit 204 moves according to the time elapsed, and therefore, it is possible to display the contents of the decision information $R_{IN}$ on the basis of change in facial expression or movement of face part (e.g. the motions of eye wink or mouth).

In the display in the animation mode, the face image is displayed on the display unit 204 as a stereographic image. Therefore, various behavior such as a nod or a shake of face can be displayed, so that it is possible to display further diversified face images on the basis of the relatively small number of primitive face images.

Further, in the case where the face image is displayed in the animation display mode, it is also preferable to provide a voice synthesizer in order to generate a voice in correspondence to the movement of the displayed face image. In this case, further diversified displays can be realized.

Figure 39:
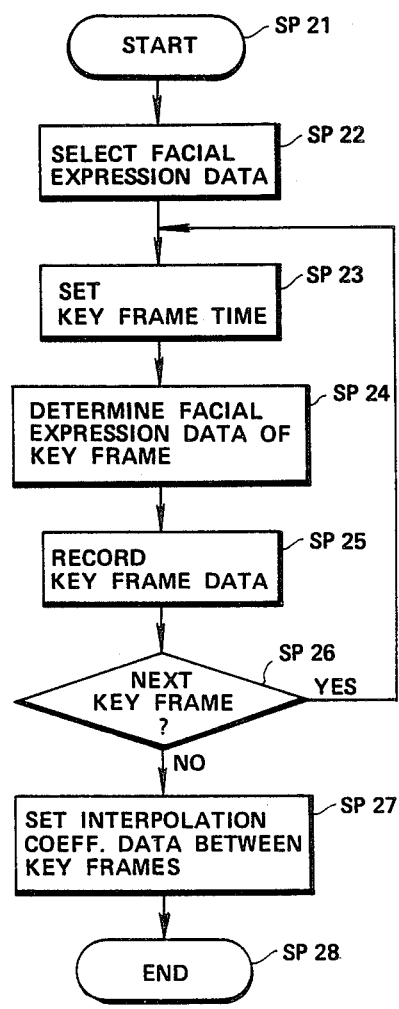
FIG. 39 is a flowchart showing the procedure of the animation display mode.

The input of data to the key frame memory 222 can be executed in accordance with the processing procedure shown in FIG. 39. That is to say, the image data controller 216 starts the processing procedure in step SP21, and selects a primitive facial expression curved surface data (shown in FIG. 36) to be used in the animation display mode from among the facial expression curved surface data stored in the facial expression curved surface data memory 202 in the succeeding step SP22.

Subsequently, the image data controller 216 sets times at which the selected face image data FD2, FD1 and FD3 should be displayed as key frames in the succeeding step SP23. In the succeeding step SP24, the face image data of the key frames are allocated to each set time, and then in step SP25 the data for each key frame is registered in the key frame memory 222.

Thereafter, the image data controller 216 determines whether there are other key frames to be set in step SP26. If there are some key frames to be set, the program returns to the step SP23 to execute the registration of data for the key frames. When the face image data FD2, FD1, and FD3 at each time point $t_1$, $t_2$, or $t_3$ have all been registered in the key frame memory 222, the image data controller 216 obtains a negative result in step SP26. Therefore, in the succeeding step SP27, the program sets the interpolation coefficient data representative of change in interpolation coefficient between key frames in the key frame memory 222, and completes the processing procedure of forming the animation display mode data in the succeeding step SP28.

In the above description, the embodiment in which expressions of human face are displayed on the display unit 204 has been described. However, without being limited to the facial expression, it is possible to display the portions of human body such as shoulder, hands, etc. which can represent the change in expression or gesture to obtain the same effect as in the above-mentioned embodiments.

What is claimed is:

1. A method of interactively generating electronic data which is representative of a curved surface and visually displaying the surface to an operator, wherein the method comprises the following steps of:
   (a) selectively generating data representative of a desired deformation area including an action point on a surface to be deformed;
   (b) selectively determining a vector field function $F_i$ representative of a relative deformation rate at each point within the deformation area;
   (c) selectively designating a deformation vector $V_i^*$ representative of a deformation quantity and a deformation direction at the action point within the deformation area;
   (d) electronically calculating a position vector representative of a deformation quantity of a curved surface at each point within the deformation area on the basis of the deformation vector $V_i^*$ and the vector field function $F_i$;
   (e) electronically calculating a position vector $P_i^*$ representative of a deformed curved surface on the basis of the position vector representative of the deformation quantity of the curved surface and a position vector $P_{i-1}^*$ representative of the surface to be deformed; and
   (f) visually displaying to an operator the deformed curved surface represented by the position vector $P_i^*$ from a preselected point of view.

2. The method of generating data representing a curved surface as set forth in claim 1, wherein the position vector representative of a deformation quantity of the curved surface is obtained by multiplying the deformation vector $V_i^*$ by the vector field function $F_i$; and the position vector $P_i^*$ representative of a deformed curved surface is obtained by adding the position vector $P_{i-1}^*$ representative of the non-deformed surface to the position vector representative of a deformation quantity of the curved surface, as expressed by a following recurrence formula:

$$P_i^* = P_{i-1}^\circ + V_i^* \circ F_i(P_{i-1}^*, CP_i^*)$$

where $CP_i^*$ denotes a position vector at the action point.

3. The method of electronically generating data representing a curved surface as set forth in claim 2, further comprising the steps of:
   (a) repeatedly electronically calculating the recurrence formula step by step to generate electronic data representative of a deformed curved surface;
   (b) electronically storing data representative of deformation parameters set in calculating the recurrence formula at each deformation step and data representative of the deformation vector and the vector field function in a command list memory;
   (c) electronically storing data representative of the position vector $P_i^*$ representative of the deformed curved surface is stored in a curved surface data memory; and
   (d) selectively electronically reproducing data representative of any given deformed curved surface obtained at each of the deformation steps on the basis of the deformation parameters stored in the command list memory and the position vector $P_i^*$ stored in the curved surface data memory, when they are read from the memories in a first predetermined sequence.

4. The method of electronically generating data representing a curved surface as set forth in claim 3, wherein the deformation calculation is executed in accordance with the following steps of:
  (a) the vector field function $F_i$ at each of the deformation steps is set on first coordinates; and
  (b) both the deformation parameters set at each of the deformation steps and stored in the command list memory and the position vectors $P_i^*$ stored in the curved surface data memory are read for deformation calculations in a second predetermined sequence.

5. A method of interactively, generating and visually displaying electronic data representative of a curved surface, which comprises the following steps of:
  (a) selectively, electronically generating data representative of a desired deformation area including an action point on a non-deformed surface;
  (b) selectively, electronically generating transformed position data by transforming each position at each deformation point within the deformation area in accordance with a predetermined position transformation function having a selectable position transformation coefficient K;
  (c) electronically calculating a vector field function $F_i$ representative of a relative deformation rate at each position on a curved surface on the basis of the transformed position data;
  (d) electronically generating data representative of a deformation vector $V_i^*$ representative of a deformation quantity and a deformation direction at the action point within the deformation area;
  (e) electronically calculating a position vector representative of a deformation quantity of a curved surface at each point within the deformation area by multiplying the deformation vector by the vector field function $F_i$;
  (f) electronically calculating a position vector representative of a transformed curved surface on the basis of the position vector representative of a deformation quantity of the curved surface and the position vector representative of the non-deformed surface; and
  (g) electronically, visually displaying said curved surface to an operator.

* * * * *